United States Patent
Jang et al.

(10) Patent No.: US 11,048,360 B2
(45) Date of Patent: Jun. 29, 2021

(54) TOUCH DISPLAY DEVICE, TOUCH CIRCUIT, PEN, TOUCH SYSTEM, AND MULTI-PEN SENSING METHOD

(71) Applicant: LG DISPLAY CO., LTD., Seoul (KR)

(72) Inventors: HyungUk Jang, Goyang-si (KR); SeungSeok Oh, Seoul (KR); SangHyuck Bae, Seoul (KR); Sungsu Han, Goyang-si (KR); Suyun Ju, Gangwon-do (KR); DoYoung Jung, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/140,903

(22) Filed: Sep. 25, 2018

(65) Prior Publication Data

US 2019/0102021 A1   Apr. 4, 2019

(30) Foreign Application Priority Data

Sep. 29, 2017   (KR) .................. 10-2017-0127978

(51) Int. Cl.
    *G06F 3/041*   (2006.01)
    *G06F 3/0354*  (2013.01)
    *G06F 3/038*   (2013.01)

(52) U.S. Cl.
    CPC ........ *G06F 3/04162* (2019.05); *G06F 3/0383* (2013.01); *G06F 3/03545* (2013.01); *G06F 3/0412* (2013.01); *G06F 3/04166* (2019.05); *G06F 2203/04106* (2013.01)

(58) Field of Classification Search
    CPC .... G06F 3/0412; G06F 3/0383; G06F 3/0416; G06F 3/03545; G06F 2203/04106
    See application file for complete search history.

(56) References Cited

U.S. PATENT DOCUMENTS

| | | | |
|---|---|---|---|
| 2015/0363012 A1* | 12/2015 | Sundara-Rajan | G06F 3/038 345/179 |
| 2016/0246390 A1 | 8/2016 | Lukanc et al. | |
| 2016/0299583 A1* | 10/2016 | Watanabe | G06F 3/0412 |
| 2017/0153763 A1* | 6/2017 | Vavra | G06F 3/0488 |
| 2018/0113519 A1* | 4/2018 | Yamamoto | G06F 3/04162 |

FOREIGN PATENT DOCUMENTS

| | | |
|---|---|---|
| JP | 2017-509044 A | 3/2017 |
| JP | 2017073149 A | 4/2017 |
| JP | 2017162517 A | 9/2017 |
| KR | 10-2016-0106662 A | 9/2016 |
| WO | 2015/105660 A1 | 7/2015 |
| WO | 2016/108216 A1 | 7/2016 |

OTHER PUBLICATIONS

European Search Report dated Jan. 31, 2019 issued in the corresponding European Patent Application No. 18195935.4, pp. 1-9.
Japanese Office action dated Jul. 23, 2019, issued counterpart Japanese Application No. 2018/179351.
Notice of Allowance dated Jun. 30, 2020 issued in corresponding Japanese Patent Application No. 2018-179351.

* cited by examiner

*Primary Examiner* — Christopher E Leiby
(74) *Attorney, Agent, or Firm* — Polsinelli PC

(57) ABSTRACT

Disclosed are a touch display device, a touch circuit, a pen, a touch system, and a multi-pen sensing method for receiving downlink signals output from two or more pens through one or more touch electrodes on a panel and distinguishably sensing the two or more pens based on unique information of the received downlink signals.

17 Claims, 29 Drawing Sheets

FIG.21

| | CASE 1 | CASE 2 |
|---|---|---|
| FREQ #1 | | |
| FREQ #2 | | |
| ⋮ | ⋮ | ⋮ |
| FREQ #N | | |

TOUCH DISPLAY DEVICE, TOUCH CIRCUIT, PEN, TOUCH SYSTEM, AND MULTI-PEN SENSING METHOD

CROSS REFERENCE TO RELATED APPLICATION

This application claims priority from Korean Patent Application No. 10-2017-0127978, filed on Sep. 29, 2017, which is hereby incorporated by reference in its entirety as if fully set forth herein.

BACKGROUND

Field of the Disclosure

The present disclosure relates to a touch display device, a touch circuit, a pen, a touch system, and a multi-pen sensing method.

Description of the Background

Demand for display devices for displaying images in various forms has increased, and recently, a variety of display devices, such as liquid crystal display devices, plasma display devices and organic light-emitting display devices, have come to be used.

Such a display device provides a touch-based input scheme which enables a user to deviate from the conventional input schemes, in which a button, a keyboard, a mouse, and the like are used, and to input information or a command easily, intuitively and conveniently.

In order to provide the touch-based input scheme, whether there is a touch by the user must be able to be recognized, and touch coordinates must be able to be accurately detected.

With an increase in the demand for not only touch input by a finger but also elaborate touch input by a pen touch technology has been developed.

However, it is very difficult for the display device to efficiently provide a finger touch and a pen touch together while basically providing a display function. Particularly, several pen touches cannot be simultaneously sensed at present.

SUMMARY

In such a background, an aspect of aspects of the present disclosure is to provide a touch display device, a touch circuit, a pen, a touch system, and a multi-pen sensing method for simultaneously sensing multiple pens.

Another aspect of aspects of the present disclosure is to provide a touch display device, a touch circuit, a pen, a touch system, and a multi-pen sensing method for accurately distinguishably recognizing multiple pens in any situation.

Still another aspect of aspects of the present disclosure is to provide a touch display device, a touch circuit, a pen, a touch system, and a multi-pen sensing method for reducing an influence of signal noise in sensing pens through signal transmission/reception between the pen and the touch panel.

Yet another aspect of aspects of the present disclosure is to provide a touch display device, a touch circuit, a pen, a touch system, and a multi-pen sensing method for increasing usage efficiency of power and a bandwidth in sensing pens through signal transmission/reception between the pen and the touch panel.

Various aspects provide a touch circuit, a pen, and a multi-pen sensing method according to the independent claims. Further aspects are described in the dependent claims. In accordance with an aspect of the present disclosure, a touch display device is provided. The touch display device includes: a panel on which a plurality of touch electrodes is arranged; and a touch circuit configured to receive a downlink signal output from each of two or more pens through one or more touch electrodes of the panel and sense the two or more pens such that the pens are distinguished from each other based on unique information of the received downlink signal.

The unique information of the downlink signal output from each of the two or more pens may be information assigned from the touch circuit or information determined based on information provided from the touch circuit.

The unique information of the downlink signal output from each of the two or more pens may correspond to a pen ID of each of the two or more pens.

The downlink signal output from each of the two or more pens may be or may include a unique code corresponding to the unique information. The unique code expressed by the downlink signal output from each of the two or more pens may be a direct sequence spread spectrum code orthogonal to each other.

The unique information of the downlink signal output from each of the two or more pens may be a unique frequency of the downlink signal output from each of the two or more pens.

The touch circuit may supply an uplink signal including available unique information to the panel and receive a downlink signal having unique information determined according to the available unique information from a pen in contact with or in proximity to the panel through the panel.

The touch circuit may transfer the available unique information to the pen in contact with or in proximity to the panel by supplying a beacon signal having the available unique information to the panel.

The beacon signal may be one of uplink signals defined by a protocol between the panel and the pen and may be supplied to the panel for one or more blank periods corresponding to a beacon signal transmission period among a plurality of blank periods within one frame time.

When the touch circuit receives downlink signals having identical unique information from the two or more pens after supplying the uplink signal including the available unique information to the panel, the touch circuit may output a reset signal to one or more of the two or more pens and receive a downlink signal having new unique information from one or more of the two or more pens.

In accordance with another aspect of the present disclosure, a touch circuit is provided. The touch circuit includes: a first circuit configured to receive a downlink signal output from each of two or more pens through a panel; and a second circuit configured to sense the two or more pens such that the two or more pens are distinguished based on unique information of the received downlink signal.

The first circuit may include: a plurality of detection circuits connected to correspond to a plurality of touch electrodes within the panel; a multiplexer configured to selectively output an output voltage output from each of the plurality of detection circuits; and an analog digital converter configured to convert the output voltage selectively output from the multiplexer into a digital value and output the converted digital value.

Each of the plurality of detection circuits may include: a decoder circuit configured to identify whether unique information of a downlink signal received from a corresponding touch electrode is included in an already known unique information list; and a detector configured to output a voltage corresponding to unique information of a downlink signal received from a corresponding touch electrode.

The panel of the touch display device may be a touch panel separately existing outside the display panel or a touch panel embedded into the display panel.

In accordance with another aspect of the present disclosure, a pen linking with a touch display device may be provided.

The pen according to aspects of the present disclosure may include: one or more pen tips in contact with or in proximity to (or, configured to be brought in contact with or in proximity to) a panel of the touch display device; a receiver configured to receive an uplink signal applied to the panel through the one or more pen tips; a transmitter configured to output a downlink signal to the panel through the one or more pen tips; and a case configured to accommodate the one or more pen tips, the receiver, and the transmitter.

The downlink signal output by the pen according to aspects of the present disclosure may be a signal defined by a protocol between the panel and the pen, that is, a signal output in response to the uplink signal and having unique information of the pen.

The uplink signal received by the pen according to aspects of the present disclosure may include a beacon signal containing available unique information.

The uplink signal received by the pen according to aspects of the present disclosure may include a spread spectrum code signal.

The downlink signal transmitted by the pen according to aspects of the present disclosure may include a signal having a unique code corresponding to unique information of the pen.

The downlink signal transmitted by the pen according to aspects of the present disclosure may include a signal having a unique frequency corresponding to unique information of the pen.

In accordance with another aspect of the present disclosure, a touch system is provided. The touch system includes: a panel on which a plurality of touch electrodes is disposed, one or more of the plurality of touch electrodes receiving an uplink signal; and two or more pens in contact with or in proximity to (or, configured to be brought in contact with or in proximity to) the panel and configured to output downlink signals having different pieces of unique information in response to the uplink signal applied to the panel.

In accordance with another aspect of the present disclosure, a multi-pen sensing method is provided. The method includes: transmitting an uplink signal to two or more pens through one or more touch electrodes within a panel; receiving a downlink signal output from each of the two or more pens through the one or more touch electrodes within the panel; and sensing the two or more pens such that the pens are distinguished based on the unique information of the downlink signal output from each of the two or more pens.

The uplink signal may include available unique information referenced to generate downlink signals having different pieces of unique information of the two or more pens.

According to the aspects of the present disclosure described above, a touch display device, a touch circuit, a pen, a touch system, and a multi-pen sensing method for enabling simultaneous sensing of multiple pens can be provided.

According to the aspects of the present disclosure described above, a touch display device, a touch circuit, a pen, a touch system, and a multi-pen sensing method for accurately distinguishably recognizing multiple pens in any situation can be provided.

According to the aspects of the present disclosure described above, a touch display device, a touch circuit, a pen, a touch system, and a multi-pen sensing method for reducing an influence of signal noise in sensing the pen through signal transmission/reception between the pen and the touch panel can be provided.

According to the aspects of the present disclosure described above, a touch display device, a touch circuit, a pen, a touch system, and a multi-pen sensing method for increasing usage efficiency of power and a bandwidth in sensing the pen through signal transmission/reception between the pen and the touch panel can be provided.

BRIEF DESCRIPTION OF THE DRAWINGS

The above and other aspects, features and advantages of the present disclosure will be more apparent from the following detailed description taken in conjunction with the accompanying drawings, in which:

FIG. 21 illustrates distinguishable frequencies when downlink signals having distinguishable frequencies as distinguishable unique information are used for multi-pen sensing of the touch display device according to aspects of the present disclosure;

DETAILED DESCRIPTION

Figure 1:
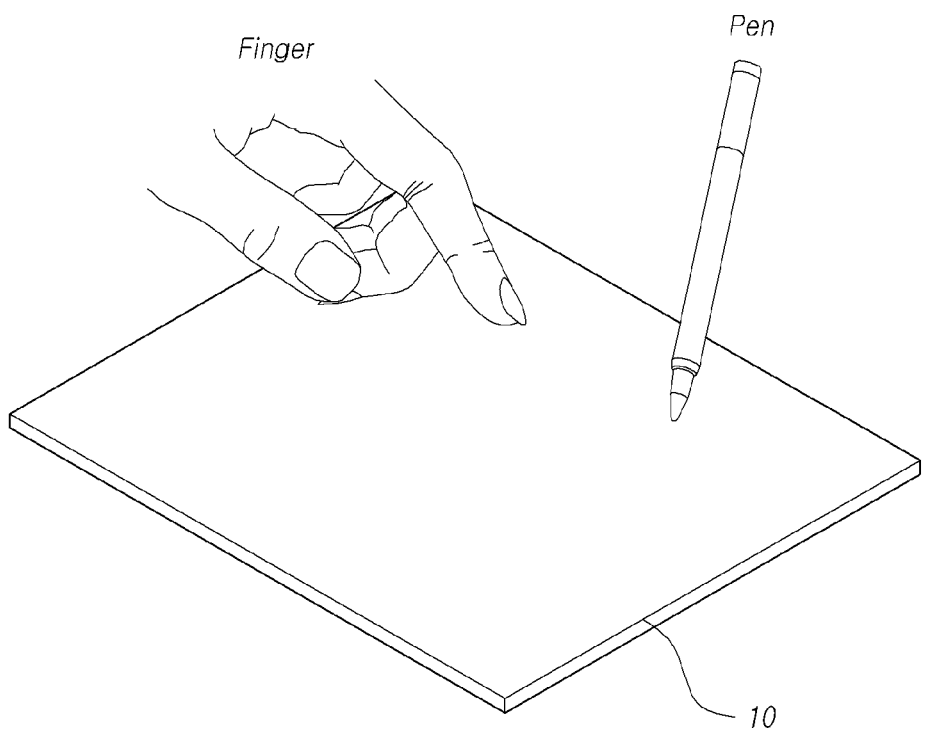
FIG. 1 illustrates a touch system according to aspects of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that still another structural element may "be connected to", "be coupled to", or "be in contact with" the structural elements (e.g., the still another structural element may be connected, coupled, or disposed in-between the certain structural element and the another structural element) as well as that the certain structural element is directly connected to or is in direct contact with the another structural element.

FIG. 1 illustrates a touch system according to aspects of the present disclosure.

The touch system according to aspects of the present disclosure may include a touch display device 10 and a pen linking with the touch display device 10.

The touch display device 10 is an electronic device, which provides not only an image display function but also a touch sensing function for a finger and a normal writing pen and a touch sensing function (i.e., pen recognition function) for one or more active pens.

The active pen may be a pen, which has a signal transmission/reception function, performs a linkage operation with the touch display device 10, or includes a self-power supply. However, throughout the specification, for convenience of description, the active pen may be briefly referred to as a "pen".

Accordingly, the pen in the specification is an active pen, and may be referred to as a stylus, a stylus pen, or an active stylus pen.

The normal writing pen distinguished from the pen in the specification does not have a signal transmission/reception function, a linkage operation with the touch display device 10, or a self-power supply, and is referred to as a passive pen.

Touch sensing by the passive pen may be performed in the same way as that of touch sensing by a finger.

In other words, the active pen is an active touch input means having a function of transmitting/receiving a signal to/from the touch display device 10, and the finger or the normal pen is a normal and passive touch input means that does not have a function of transmitting/receiving a signal to/from the touch display device 10.

Hereinafter, for convenience of description, a finger is described as a representative of the passive touch input means. However, a finger described below should be construed as a meaning including all normal and passive touch input means such as a normal pen.

A touch display device 10 according to aspects of the present disclosure may be, for example, a television (TV), a monitor, or a mobile device such as a tablet PC and a smart phone.

The touch display device 10 according to aspects of the present disclosure may include a display part for providing an image display function and a touch sensing part for touch sensing.

Hereinafter, the structure of the display part and the touch sensing part of the touch display device 10 will be briefly described with reference to FIGS. 2 to 5.

Figure 2:
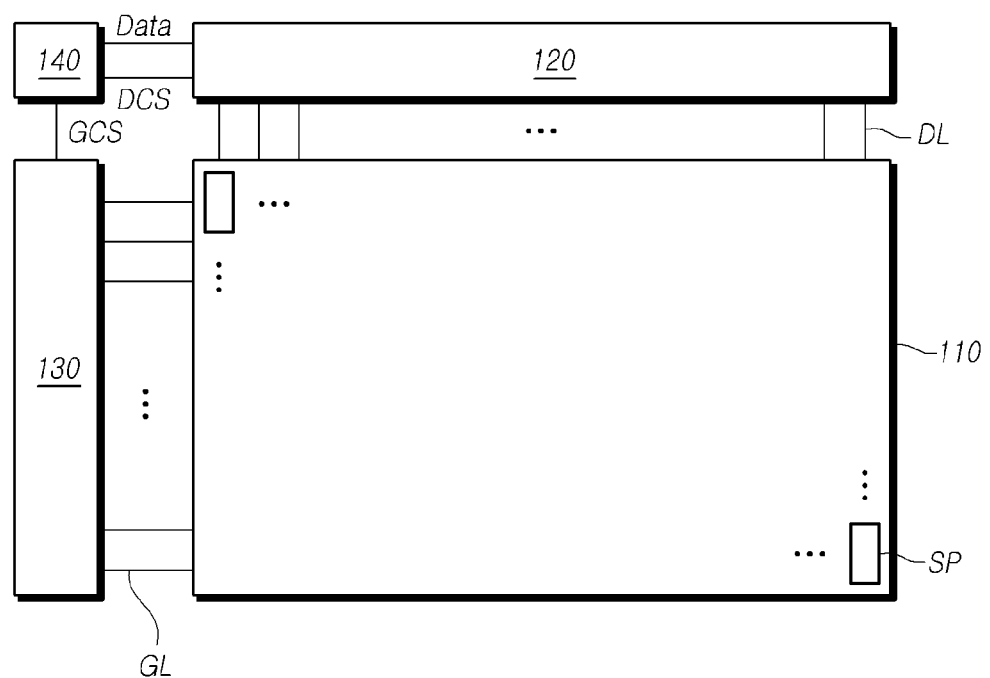
FIG. 2 illustrates a display part in a touch display device according to aspects of the present disclosure.
Figure 3:
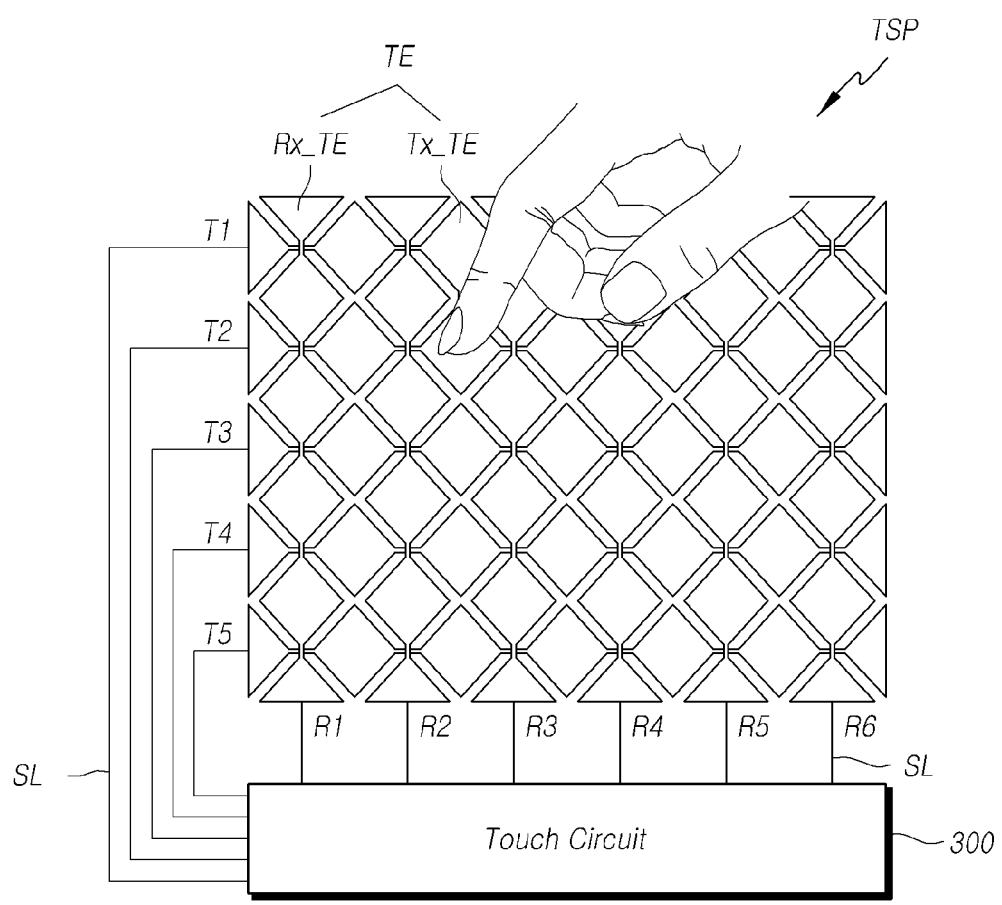
FIG. 3 illustrates a touch sensing part for touch sensing based on mutual capacitance in the touch display device according to aspects of the present disclosure.
Figure 4:
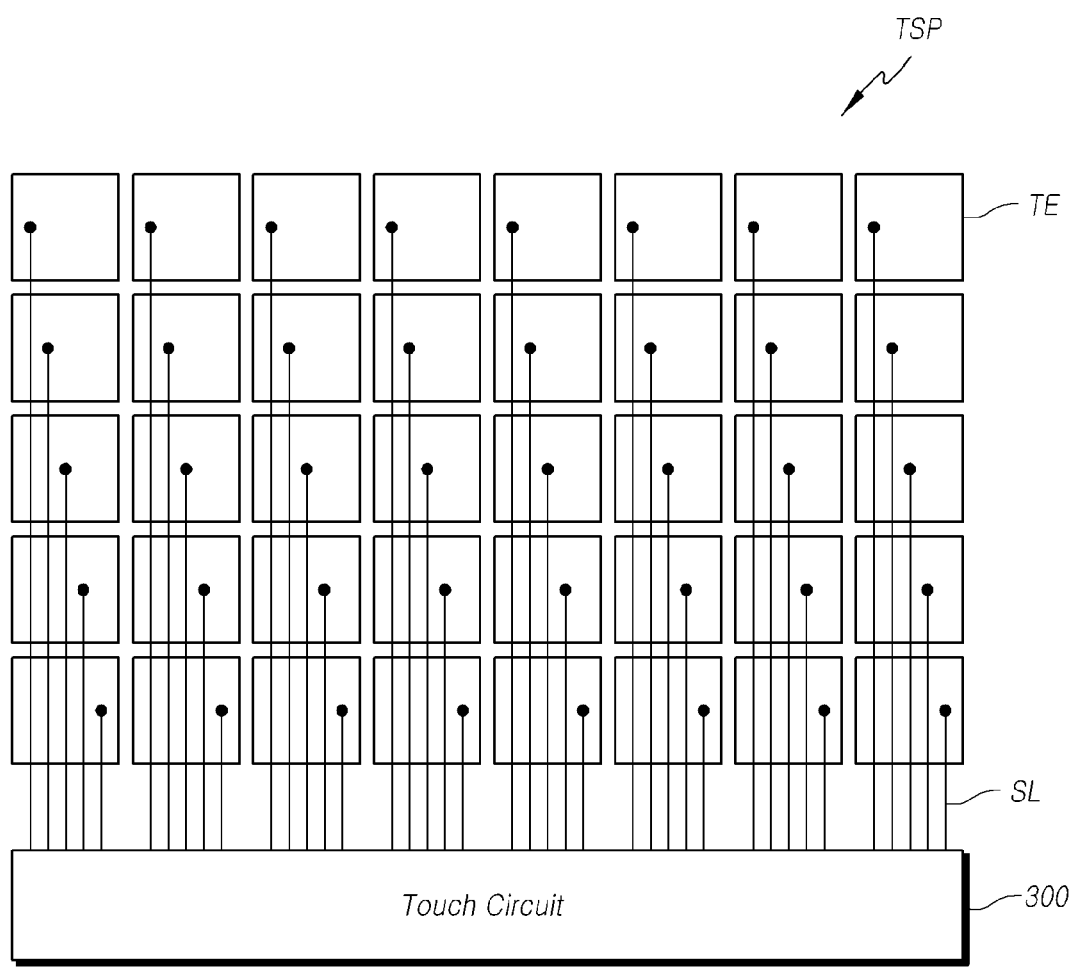
FIG. 4 illustrates a touch sensing part for touch sensing based on self-capacitance in the touch display device according to aspects of the present disclosure.
Figure 5:
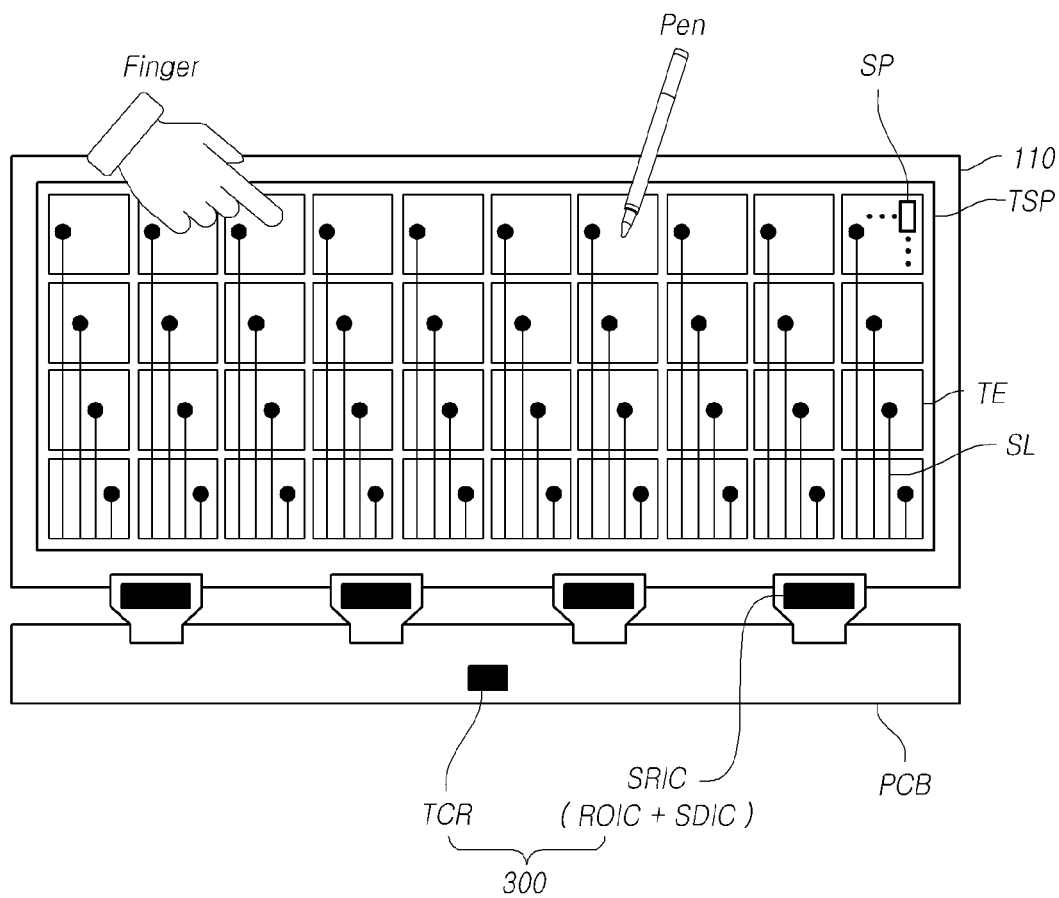
FIG. 5 illustrates an implementation example of the touch display device according to aspects of the present disclosure.

FIG. 2 illustrates the display part of the touch display device 10 according to aspects of the present disclosure. FIGS. 3 and 4 illustrate two types of the touch sensing part of the touch display device 10 according to aspects of the present disclosure. FIG. 5 illustrates an implementation example of the touch display device 10 according to aspects of the present disclosure.

Referring to FIG. 2, the display part of the touch display device 10 according to aspects of the present disclosure may include a display panel 110, a data driving circuit 120, a gate driving circuit 130, and a controller 140.

On the display panel 110, a plurality of data lines (DL) and a plurality of gate lines (GL) are arranged, and a plurality of subpixels (SP) defined by the plurality of data lines (DL) and the plurality of gate lines (GL) is arranged.

The data driving circuit 120 supplies a data voltage to the plurality of data lines (DL) to drive the plurality of data lines (DL).

The gate driving circuit 130 sequentially supplies a scan signal to the plurality of gate lines (GL) to drive the plurality of gate lines (GL).

The controller 140 controls the data driving circuit 120 and the gate driving circuit 130 by supplying various control signals (e.g., DCS and GCS) to the data driving circuit 120 and the gate driving circuit 130.

The controller 140 starts a scan according to timing implemented in each frame, switches input image data received from the outside according to a data signal format used in the data driving circuit 120, outputs the switched image data, and controls data driving according to a proper time based on the scan.

The controller 140 may be a timing controller used in a general display technology or a control device that includes the timing controller and further performs other control functions.

The controller 140 may be implemented as an element separated from the data driving circuit 120 or implemented as an integrated circuit with the data driving circuit 120.

Meanwhile, the data-driving circuit 120 may include at least one source driver integrated circuit.

Each source driver integrated circuit may include a shift register, a latch circuit, a Digital-to-Analog Converter (DAC), an output buffer, and the like.

Each source driver integrated circuit may further include an Analog-to-Digital Converter (ADC) according to the circumstances.

The gate driving circuit 130 may include at least one gate driver integrated circuit.

Each gate driver integrated circuit may include a shift register, a level shifter, and the like.

The data driving circuit 120 may be located at only one side (for example, the upper side or the lower side) of the display panel 110 or may be located at two opposite sides (for example, the upper side and the lower side) of the display panel 110 according to a driving type or a panel design type in some cases.

The gate driving circuit 130 may be located at only one side (for example, the left side or the right side) of the display panel 110 or may be located at two opposite sides (for example, the left side and the right side) of the display panel 110 according to a driving type or a panel design type in some cases.

Meanwhile, the display panel 110 may be a display panel in various types such as a liquid crystal display panel, an organic light emitting display panel, and a plasma display panel.

The touch display device 10 may sense touch input by a finger and/or a pen through a touch sensing scheme based on capacitance.

To this end, as illustrated in FIGS. 3 and 4, the touch display device 10 may include a touch panel (TSP), on which touch electrodes (TE) are arranged, and a touch circuit 300 for driving the touch panel (TSP).

The touch display device 10 may provide a mutual-capacitance-based touch sensing function of sensing touch input by measuring capacitance formed between two touch electrodes (Tx_TE and Rx_TE) or a change in the capacitance or provide a self-capacitance-based touch sensing function of sensing touch input by measuring capacitance formed in every touch electrode (TE) or a change in the capacitance.

Referring to FIG. 3, for touch sensing based on mutual capacitance, first touch electrode lines (T1 to T5, also referred to as touch driving lines), to which a touch driving signal is applied, and second touch electrode lines (R1 to R6, also referred to as touch sensing lines) for sensing a touch sensing signal are arranged to cross each other on the touch panel (TSP).

Each of the first touch electrode lines (T1 to T5) may be a bar type electrode extending in a horizontal direction, and each of the second touch electrode lines (R1 to R6) may be a bar type electrode extending in a vertical direction.

Unlike this, as illustrated in FIG. 3, each of the first touch electrode lines (T1 to T5) may be formed through electrical connection of the first touch electrodes (Tx_TE, also referred to as touch driving electrodes) disposed on the same row. Each of the second touch electrode lines (R1 to R6) may be formed through electrical connection of the second touch electrodes (Rx_TE, also referred to as touch sensing electrodes) disposed on the same column.

Each of the first touch electrode lines (T1 to T5) may be electrically connected to the touch circuit 300 through one or more signal lines (SL). Each of the second touch electrode lines (R1 to R6) may be electrically connected to the touch circuit 300 through one or more signal lines (SL).

Referring to FIG. 4, for touch sensing based on self-capacitance, a plurality of touch electrodes (TE) may be arranged on the touch panel (TSP).

A touch driving signal may be applied to each of the plurality of touch electrodes (TE) and a touch sensing signal may be sensed by each of the plurality of touch electrodes.

Each of the plurality of touch electrodes (TE) may be electrically connected to the touch circuit 300 through one or more signal lines (SL).

Hereinafter, for convenience of description, it is assumed that the touch display device 10 provides a self-capacitance-based touch sensing scheme and the touch panel (TSP) is designed as illustrated in FIG. 4 for touch sensing based on self-capacitance.

The form of one touch electrode (TE) illustrated in FIGS. 3 and 4 is only an example and may be variously designed.

Further, the size of an area in which one touch electrode (TE) is formed may correspond to the size of an area in which one subpixel is formed.

Alternatively, the size of the area in which one touch electrode (TE) is formed may be larger than the size of the area in which one subpixel is formed. In this case, one touch electrode (TE) may overlap two or more data lines and two or more gate lines.

For example, the size of the area in which one touch electrode (TE) is formed may correspond to the size of the area of several subpixels to scores of subpixels.

Meanwhile, the touch panel (TSP) may be an external type (referred to as an add-on type) in which the touch panel (TSP) is manufactured separately from the display panel 110 and added to the display panel 110 or an internal type (referred to as an in-cell type or an on-cell type) in which the touch panel (TSP) is embedded into the display panel 110.

Meanwhile, and referring to FIG. 5, the touch circuit 300 may include one or more first circuits (ROIC) for supplying a touch driving signal to the touch panel (TSP) and detecting (receiving) a touch sensing signal from the touch panel (TSP) and a second circuit (TCR) for recognizing whether there is touch input and/or a position of touch input based on the touch sensing signal detection result obtained by the first circuits (ROIC).

One or more first circuits (ROIC) included in the touch circuit 300 may be implemented as separate elements or a single element.

Meanwhile, one or more first circuits (ROIC) included in the touch circuit 300 may be implemented as one or more integrated circuits (SRIC) together with one or more source driver integrated circuit (SDIC) constituting the data driving circuit 120.

That is, the touch display device 10 may include one or more integrated circuits (SRIC), and each integrated circuit (SRIC) may include the first circuit (ROIC) and the source driver integrated circuit (SDIC).

As described above, through the integrated implementation of the first circuit (ROIC) for touch driving and the source driving integrated circuit (SDIC) for data driving, touch driving and data driving may be effectively performed when the touch panel (TSP) is an internal type in which the touch panel (TSP) is embedded into the display panel 110 and, when signal lines (SL) connected to the touch electrodes (TE) are arranged in parallel to the data lines (DL).

Meanwhile, when the touch panel (TSP) is an internal type in which the touch panel (TSP) is embedded into the display panel 110, the touch electrodes (TE) may be variously made.

When the touch display device 10 is implemented as a liquid crystal display device, the touch electrodes (TE) may be separated common electrodes to which a touch driving signal is applied for a touch driving period for touch sensing or in which a touch sensing signal is detected and to which a common voltage is applied for a display driving period for image display.

In this case, for the display driving period, all of the touch electrodes (TE) may be electrically connected within the touch circuit 300 and may receive a common voltage in common.

For the touch driving period, some or all of the touch electrodes (TE) may be selected within the touch circuit 300, and the touch driving signal may be applied to one or more selected touch electrodes (TE) from the first circuit (ROIC) of the touch circuit 300 or the touch sensing signal may be detected by the first circuit (ROIC) of the touch circuit 300.

Further, each touch electrode (TE) may have a plurality of slits (also referred to as holes) to form an electric field with a pixel electrode within a plurality of overlapping subpixels.

Meanwhile, when the touch display device 10 is implemented as an organic light emitting display device, the plurality of touch electrodes (TE) and the plurality of signal lines (SL) may be disposed on the front surface of the display panel 110 and located on an encapsulation layer arranged on a common electrode (for example, a cathode electrode) to which the common voltage is applied.

The common electrode disposed on the front surface of the display panel 110 may be, for example, a cathode electrode among an anode electrode (corresponding to a pixel electrode) and a cathode electrode of an Organic Light Emitting Diode (OLED) within each subpixel, and the common voltage may be applied to the cathode electrode.

In this case, each of the plurality of touch electrodes (TE) may be a plate shape electrode type having no open area. At this time, each of the plurality of touch electrodes (TE) may be a transparent electrode for emission of the subpixels (SP).

Alternatively, each of the plurality of touch electrodes (TE) may be a mesh-type electrode having several open areas. At this time, the open area in each of the plurality of touch electrodes (TE) may correspond to an emission area (for example, an area in which part of the anode electrode is located) of the subpixel (SP).

Meanwhile, when a panel driving signal is supplied to the touch electrodes (TE) and the signal lines (SL) for a touch driving period (touch sensing period), a signal, which is the same as or corresponds to the panel driving signal, may be applied to electrodes and signal lines, which are different from the touch electrodes (TE) and the signal lines (SL) to which the panel driving signal is applied. The panel driving signal may be a touch driving signal for sensing touch input by a finger and/or a pen or recognizing pen information on a pen.

For example, for the touch driving period, the panel driving signal or a signal corresponding to the panel driving signal may be applied to all or some of the data lines.

In another example, for the touch driving period, the panel driving signal or a signal corresponding to the panel driving signal may be applied to all or some of the gate lines.

In still another example, for the touch driving period, the panel driving signal or a signal corresponding to the panel driving signal may be applied to all touch electrodes (TE).

Meanwhile, according to aspects, the panel driving signal may include all signals applied to the touch panel (TSP), the display panel 110, or the display panel 110 into which the touch panel (TSP) is embedded.

Meanwhile, in connection with the implementation and the disposed position of the integrated circuit, for example, the integrated circuit (SRIC) may be mounted on a film of which two opposite ends are connected to the touch panel (TSP) and a printed circuit board (PCB), respectively, as illustrated in FIG. 5.

As described above, the integrated circuit (SRIC) in a chip on film (COF) type may be electrically connected to the touch panel (TSP) and electrically connected to the second circuit (TCR) on the Printed Circuit Board (PCB) through wires on the film.

The integrated circuit (SRIC) may be implemented in a chip on glass (COG) type in which the integrated circuit (SRIC) is disposed on the touch panel (TSP).

Meanwhile, one or more first circuits (ROIC) and the second circuit (TCR) of the touch circuit 300 may be integratively implemented as a single element.

Figure 6:
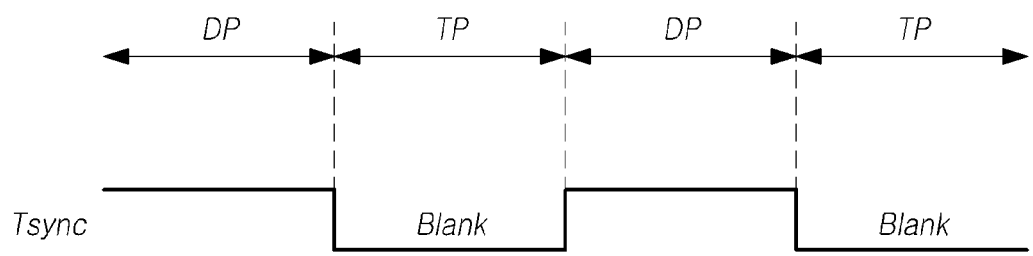
FIG. 6 illustrates an example of timing of a display driving period and a touch driving period of the touch display device according to aspects of the present disclosure.
Figure 7:
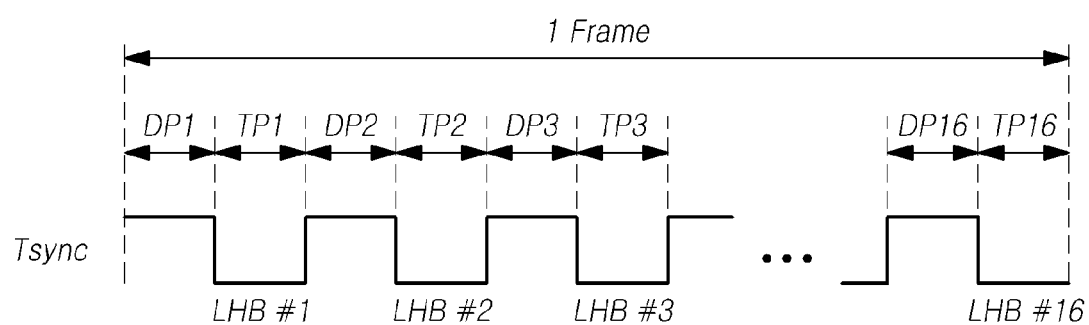
FIG. 7 illustrates an example of display driving periods and touch driving periods into which one frame time is temporally divided in the touch display device according to aspects of the present disclosure.

FIG. 6 illustrates an example of timing of a display driving period (DP) and a touch driving period (TP) of the touch display device 10 according to aspects of the present disclosure. FIG. 7 illustrates an example of 16 display driving periods (DP1 to DP16) and 16 touch driving periods (TP1 to TP16) obtained by temporally dividing one frame time in the touch display device 10 according to aspects of the present disclosure.

Referring to FIG. 6, the touch display device 10 according to aspects of the present disclosure performs display driving for displaying an image for a predetermined display driving period (DP) and performs touch driving for sensing touch input by a finger and/or a pen for a predetermined touch driving period (TP).

The display driving period (DP) and the touch driving period (TP) may be temporally the same as or overlap each other or may be temporally separated.

When the display driving period (DP) and the touch driving period (TP) are temporally the same as each other, display driving and touch driving may be simultaneously performed.

However, hereinafter, it is assumed that the display driving period (DP) and the touch driving period (TP) are temporally separate periods. In this case, the display driving period (DP) and the touch driving period (TP) alternate.

As described above, when the display driving period (DP) and the touch driving period (TP) are temporally separated while alternating, the touch driving period (TP) may be a blank period in which display driving is not performed.

The touch display device 10 may generate a synchronization signal (Tsync) swinging between a high level and a low level and may identify or control the display driving period (DP) and the touch driving period (TP) through the synchronization signal (Tsync).

For example, a high level period (or a low level period) of the synchronization signal (Tsync) may correspond to the display driving period (DP), and the low level period (or the high level period) of the synchronization signal (Tsync) may correspond to the touch driving period (TP).

Meanwhile, in connection with a scheme of allocating the display driving period (DP) and the touch driving period (TP) within one frame time, for example, one frame time may be temporally divided into one display driving period (DP) and one touch driving period (TP). Display driving may be performed for one display driving period (DP) and touch driving for sensing touch input by a finger and/or a pen may be performed for one touch driving period (TP) corresponding to the blank period.

In another example, one frame time may be temporally divided into two or more display driving periods (DP) and two or more touch driving periods (TP). For two or more display driving periods (DP) within one frame time, display driving for one frame may be performed. For two or more touch driving periods (TP) corresponding to the blank period within one frame time, touch driving for sensing touch input by a finger and/or pen in an entire screen area once or more may be performed or touch driving for sensing touch input by a finger and/or a pen in a partial screen area may be performed.

Meanwhile, when one frame time is temporally divided into two or more display driving periods (DP) and two or more touch driving periods (TP), each of two or more blank periods corresponding to the two or more touch driving periods (TP) within one frame time is referred to as a "Long Horizontal Blank (LHB)".

Here, touch driving performed for two or more LHBs within one frame time is referred to as "LHB driving".

Referring to FIG. 7, one frame time may be temporally divided into 16 display driving periods (DP1 to DP16) and 16 touch driving periods (TP1 to TP16).

In this case, 16 touch driving periods (TP1 to TP16) correspond to 16 LHBs (LHB #1 to LHB #16).

Hereinafter, when one frame time is divided into 16 display driving periods (DP1 to DP16) and 16 touch driving periods (TP1 to TP16), a method of sensing touch input by a finger and/or a pen will be described.

Figure 8:
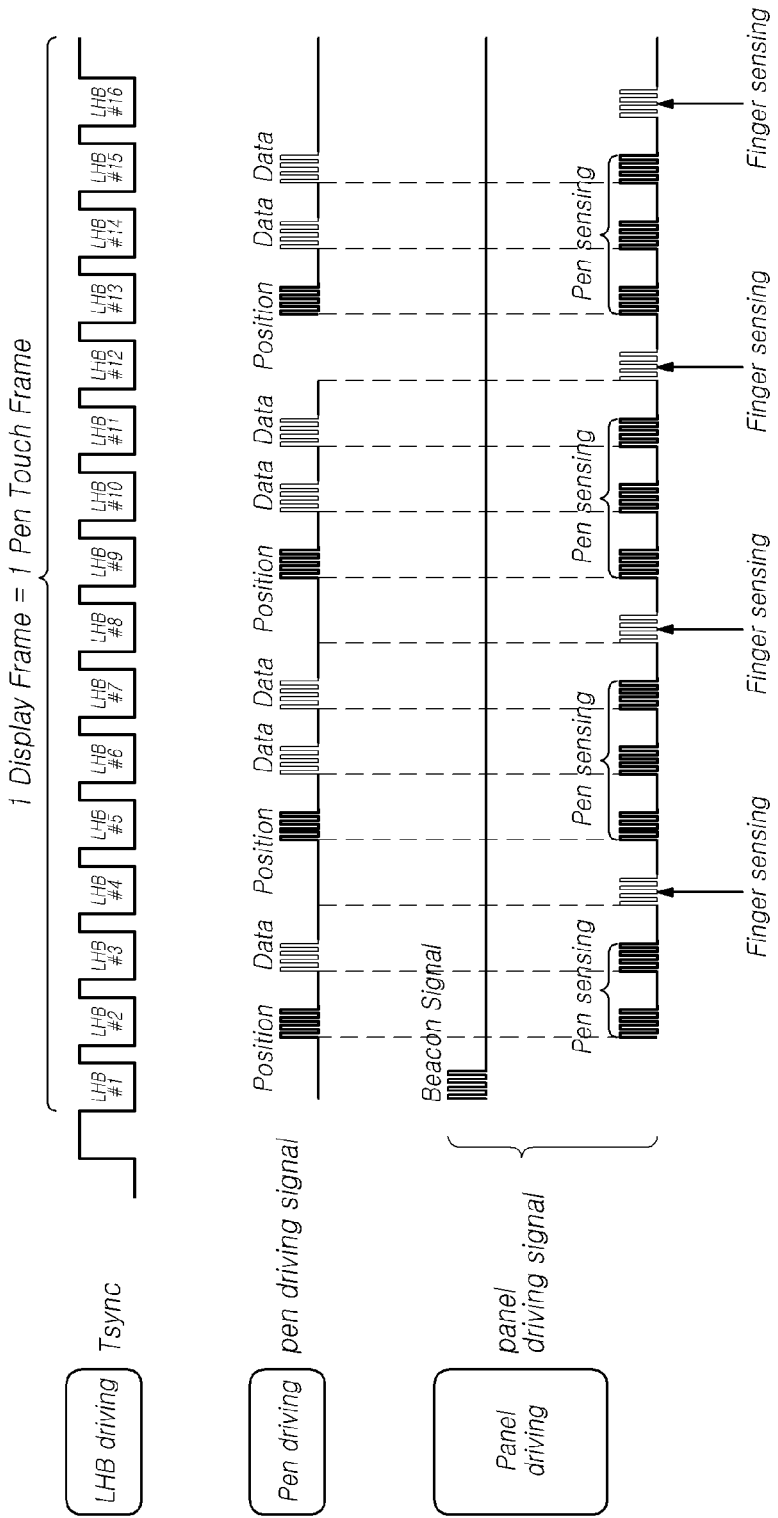
FIG. 8 illustrates an example of driving timing of the touch display device according to aspects of the present disclosure.
Figure 9:
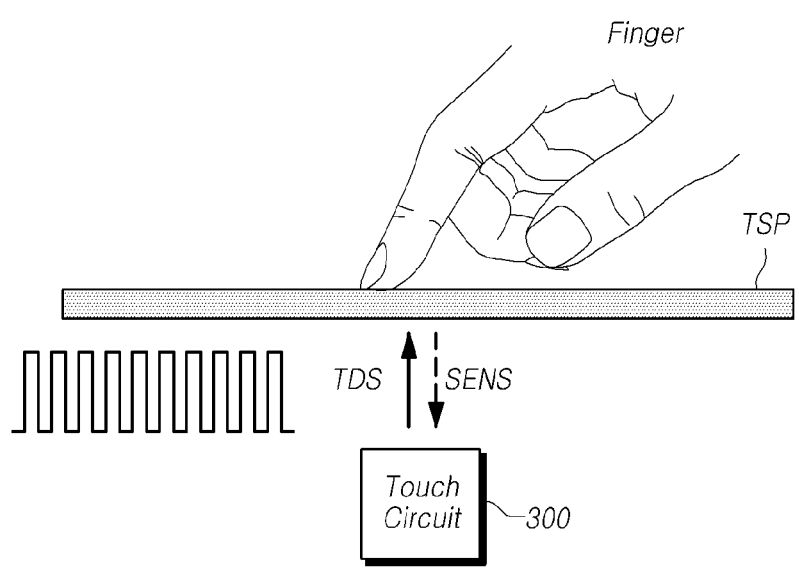
FIG. 9 is a driving conceptual diagram for sensing a finger or a passive pen in a touch system according to aspects of the present disclosure.
Figure 10:
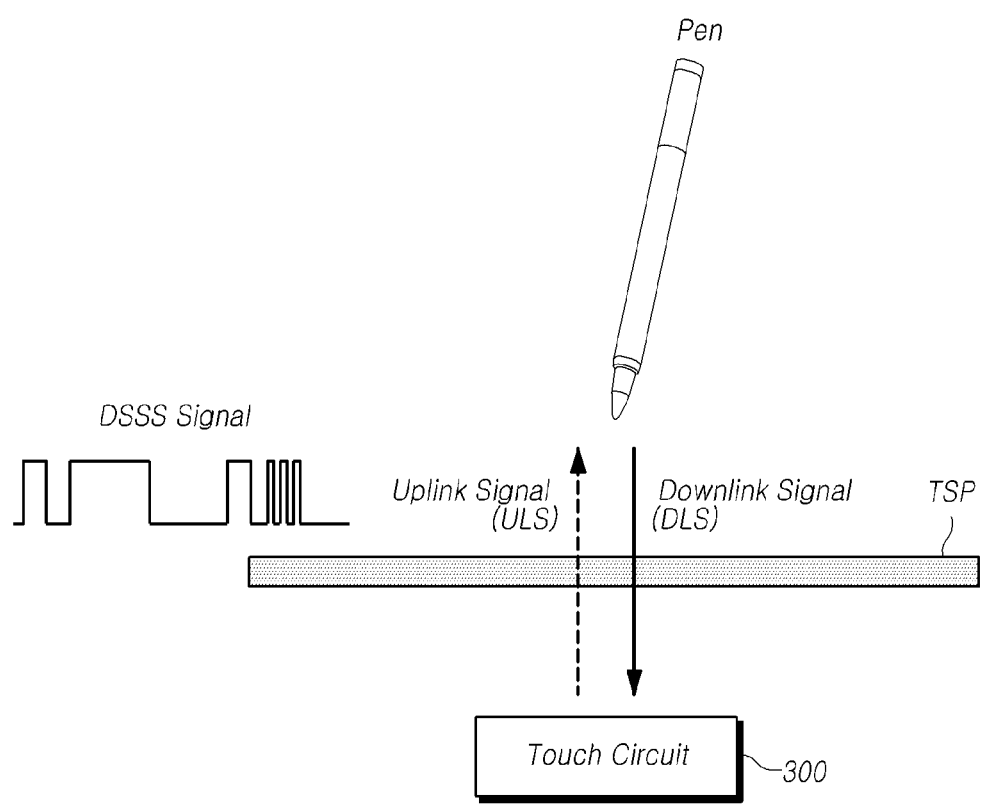
FIG. 10 is a driving conceptual diagram for sensing an active pen in the touch system according to aspects of the present disclosure.

FIG. 8 illustrates an example of driving timing of the touch display device 10 according to aspects of the present disclosure. FIG. 9 is a driving conceptual diagram for sensing a finger in a touch system according to aspects of the present disclosure. FIG. 10 is a driving conceptual diagram for sensing a pen in a touch system according to aspects of the present disclosure.

Referring to FIG. 8, as illustrated in FIG. 7, there are 16 LHBs (LHB #1 to LHB #16) corresponding to the touch driving periods (TP) within one frame (display frame) time.

Through touch driving during 16 LHBs (LHB #1 to LHB #16), a finger touch and/or a pen touch in an entire screen area may be sensed. In this case, one display frame is the same as one touch frame (also referred to as a pen touch frame). One touch frame (pen touch frame) may be a period in which whether there is a finger touch or a pen touch in the entire screen area is sensed or a position of the touch is sensed.

Meanwhile, a start time and/or an end time of the display frame may be the same as or different from a start time and/or an end time of the touch frame.

Meanwhile, a time length of the display frame may be the same as or different from a time length of the touch frame.

The touch may be sensed once or twice in the entire screen area while the entire screen is displayed once. Unlike this, the touch may be sensed once in the entire screen area while the entire screen area is displayed twice or more. That is, the touch frame time may be the same as the display frame time or may be shorter or longer than the display frame time.

During one touch frame, the touch by the finger or the pen may be sensed in the entire screen area.

Meanwhile, in order to allow the touch display device 100 to recognize the presence of a pen, the touch system may first operate in a pen searching mode. Thereafter, the touch system may operate in a pen mode in which the found pen is sensed.

16 LHBs (LHB #1 to LHB #16) within one touch frame may include one or more of at least one LHB (LHB #1) corresponding to a beacon signal transmission period in which a beacon signal corresponding to a driving control signal for pen sensing is transferred from the touch panel (TSP) to the pen, at least one LHB (LHB #2, LHB #5, LHB #9, and LHB #13) corresponding to a pen position sensing period in which the touch circuit 300 senses a position (and/or tilt) of the pen, at least one LHB (LHB #3, LHB #6, LHB #7, LHB #10, LHB #11, LHB #14, and LHB #15) corresponding to a pen information sensing period in which the touch circuit 300 senses various pieces of additional information (also referred to as data) of the pen, and at least one LHB (LHB #4, LHB #8, LHB #12, and LHB #16) corresponding to a finger sensing period in which the touch circuit 300 senses the touch by the finger (or a normal pen).

A signal output from the pen and applied to the touch panel (TSP) may be referred to as a pen driving signal (or a pen signal).

A signal output from the touch circuit 300 and applied to the touch panel (TSP) may be referred to as a panel driving signal. The panel driving signal may include a panel driving signal for pen sensing and a panel driving signal for finger sensing.

A link from the touch panel (TSP) to the pen is referred to as an uplink and a link from the pen to the touch panel (TSP) is referred to as a downlink.

In this light, the pen driving signal output from the pen and applied to the touch panel (TSP) may be referred to as a Downlink Signal (DLS) and the panel driving signal output from the touch circuit 300 and transferred to the pen through the touch panel (TSP) may be referred to as an Uplink Signal (ULS).

The downlink signal (DLS) is a signal required when the touch circuit 300 senses the position of the pen or additional information, and is referred to as a pen driving signal, a pen signal, or a pen sensing signal.

The uplink signal (ULS) is a signal for transferring various pieces of information required for pen driving.

As the uplink signal (ULS), there is a beacon signal transmitted from the touch panel (TSP) to the pen during a predetermined LHB (for example, LHB #1).

A time interval in which the beacon signal is transmitted may correspond to one or more LHBs within one display frame. The LHB positions may be LHB #1, LHB #2, and LHB #3 or may be variously configured as certain LHBs.

Alternatively, the time interval in which the beacon signal is transmitted may correspond to one or more LHBs within two or more display frames. The time interval in which the beacon signal is transmitted may not exist in any display frame.

The beacon signal is a control signal by which the touch display device 10 controls pen driving or informs the pen of required information and may include various pieces of information required for pen driving.

For example, the beacon signal may include one or more pieces of touch panel information (for example, touch panel state information, touch panel identification information, and touch panel type information such as in-cell type), panel driving mode information (for example, identification information of pen searching mode and pen mode), feature information of the pen signal (for example, a frequency and the number of pulses), LHB driving information, multiplexer driving information, and power mode information (for example, information on an LHB in which the panel and the pen are not driven in order to reduce power consumption).

Meanwhile, the beacon signal may further include information for driving synchronization between the touch panel (TSP) and the pen.

Various pieces of information included in the beacon signal may be stored in a look-up table of the touch display device 10.

All or some of the various pieces of information stored in the look-up table of the touch display device 10 may be also equally stored in the pen.

Meanwhile, as the uplink signal (ULS), there may be a ping signal transmitted from the touch panel (TSP) to the pen during at least one LHBs among the LHBs (LHB #2, LHB #3, LHB #5, LHB #6, LHB #7, LHB #9, LHB #10, LHB #11, LHB #13, LHB #14, and LHB #15) for sensing the position or data of the pen.

The pen may output the pen signal through synchronization with the ping signal received through the touch panel (TSP). For example, the pen may output the pen signal after a predetermined time from a time at which the ping signal is received through the touch panel (TSP).

The uplink signal (ULS) described above may be, for example, a spread spectrum signal (also referred to as a spread spectrum code) using a spectrum spread scheme in which information is transmitted using a bandwidth much wider than a bandwidth required for transmitting specific information in order to reduce a noise effect.

As described above, when the touch display device 10 transmits the uplink signal (ULS) in the form of spread spectrum signal (also referred to as the spread spectrum code), an effect on noise due to another signal may be reduced.

Meanwhile, the touch display device 10 may transmit the uplink signal (ULS) in the form of a Direct Sequence Spread Spectrum (DSSS) signal (or DSSS code) in which one signal symbol is spread and communicated in a predetermined sequence, as illustrated in FIG. 10.

As described above, when the uplink signal (ULS) is the DSSS signal (DSSS code), it is possible to further increase power efficiency or bandwidth efficiency.

When the uplink signal (ULS) is the DSSS signal (DSSS code), the downlink signal (DLS) may be also a DSSS signal (DSSS code).

The operation of the touch system during the beacon signal transmission period, the pen position sensing period, the pen information sensing period, and the finger sensing period will be briefly described.

During at least one LHB (for example, LHB #1) period predetermined as the beacon signal transmission period, the touch circuit 300 applies a beacon signal, which is one of the uplink signals (ULS) to the touch panel (TSP). Accordingly, the pen in contact with or in proximity to the touch panel (TSP) receives the beacon signal applied to the touch panel (TSP) through one or more pen tips. The pen may recognize various pieces of information required for driving from the received beacon signal and perform a pen driving operation during one pen touch frame.

During at least one LHB (LHB #2, LHB #5, LHB #9, and LHB #13) corresponding to the pen position sensing period, the pen outputs the pen signal (pen driving signal) corresponding to the downlink signal (DLS). Accordingly, the pen signal output from the pen is applied to the touch panel (TSP). The touch circuit 300 may sense the position or tilt of the pen by receiving the pen signal applied to the touch panel (TSP) from the touch electrode (TE).

During at least one LHB (LHB #3, LHB #6, LHB #7, LHB #10, LHB #11, LHB #14, and LHB #15) corresponding to the pen information sensing period, the pen outputs the pen signal (pen driving signal) corresponding to the downlink signal (DLS) and containing various pieces of additional information. The pen signal containing various pieces of additional information is referred to as data. Accordingly, data output from the pen is applied to the touch panel (TSP). The touch circuit 300 may sense various pieces of additional information by receiving the data applied to the touch panel (TSP) from the touch electrode (TE).

For example, additional information of the pen may include one or more pieces of pen identification information of the pen, input information of a button included in the pen, pressure applied to a pen tip (referred to as pen pressure), information on a status of a battery in the pen, and checksum information of data transmitted/received by the pen.

The driving operation of the touch display device 10 and the pen related to pen sensing, and various signals and data related thereto may be predefined by a protocol and implemented by software (program), and the implemented software (program) may be executed by the touch display device 10 and the pen.

Meanwhile, during at least one LHB (LHB #4, LHB #8, LHB #12, and LHB #16) corresponding to the finger sensing period, the touch circuit 300 may apply the touch driving signal (TDS) to at least one touch electrode (TE) within the touch panel (TSP) and receive the touch sensing signal (SENS) from the touch electrode (TE) to which the touch driving signal (TDS) is applied, so as to sense the finger (or the normal pen), as illustrated in FIG. 9.

The touch driving signal (TDS) may be a signal of which the voltage level is variable. For example, the touch driving signal (TDS) may be in the form of a pulse signal having a predetermined frequency and swinging between a predetermined amplitude.

Meanwhile, a ground voltage of the ground to which the display panel 110 including the touch panel (TSP) therein is grounded may be a DC voltage or a signal of which the voltage level is variable.

When the ground voltage (modulated ground voltage) of the ground to which the display panel 110 including the touch panel (TSP) therein is grounded is the signal of which the voltage level is variable, the touch driving signal (TDS) may be a signal having at least one of a frequency, an amplitude, a voltage polarity, and a phase corresponding to the ground voltage (modulated ground voltage) of which the voltage level is variable.

For example, the touch driving signal (TDS) may be completely the same as the ground voltage (modulated ground voltage) of which the voltage level is variable or all signal attributes thereof are the same as those of the ground voltage with only difference in the amplitude. The touch driving signal (TDS) may be a common voltage for driving a display.

Meanwhile, the second circuit (TCR) of the touch circuit 300 and the timing controller 140 may be grounded to a ground different from that connected to the display panel 110. Here, the phrase "something is connected to the ground" may mean that "something is grounded" or "something is grounded to the ground".

For example, the voltage (ground voltage) of the ground to which the second circuit (TCR) of the touch circuit 300 and the timing controller 140 are connected may be a DC voltage (DC ground voltage).

The voltage of the ground (second ground) to which the display panel 110 is connected may be a modulated ground voltage compared to the voltage of the ground (first ground) to which the second circuit (TCR) of the touch circuit 300 and the timing controller 140 are connected. In this case, signals applied to all electrodes and wires on the display panel 110 may be swung to correspond to the modulated ground voltage.

In connection with a ground modulation scheme, the voltage of the ground (second ground) to which the display panel 110 is connected may be modulated according to a pulse modulation signal (for example, a PWM signal) output from the second circuit (TCR). Since the touch display device 10 according to aspects of the present disclosure has two grounds (the first ground and the second ground), the two grounds may be electrically separated.

The touch display device 10 according to aspects of the present disclosure has one or more grounds. Such grounds may be, for example, a ground wire or a ground electrode arranged on the display panel 110, an external structure (for example, a large metal plate) such as an external cover of the display panel 110, or a wire or an electrode arranged on the external structure.

Figure 11:
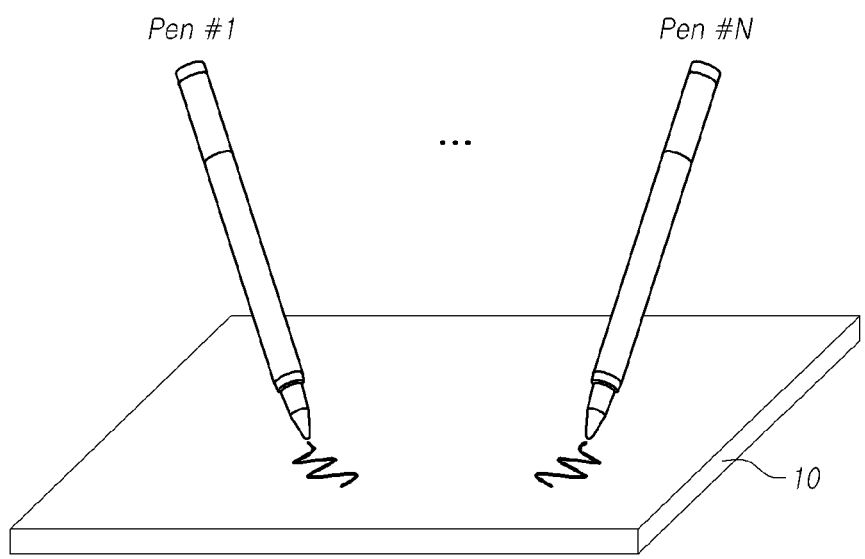
FIG. 11 is a diagram illustrating multi-pen sensing of the touch display device according to aspects of the present disclosure.

FIG. 11 illustrates multi-pen sensing of the touch display device 10 according to aspects of the present disclosure.

The touch display device 10 according to aspects of the present disclosure may sense N (N being a natural number larger than or equal to 1) pens.

The touch display device 10 according to aspects of the present disclosure may simultaneously sense two or more pens. That is, the touch display device 10 according to aspects of the present disclosure may sense multiple pens.

Figure 12:
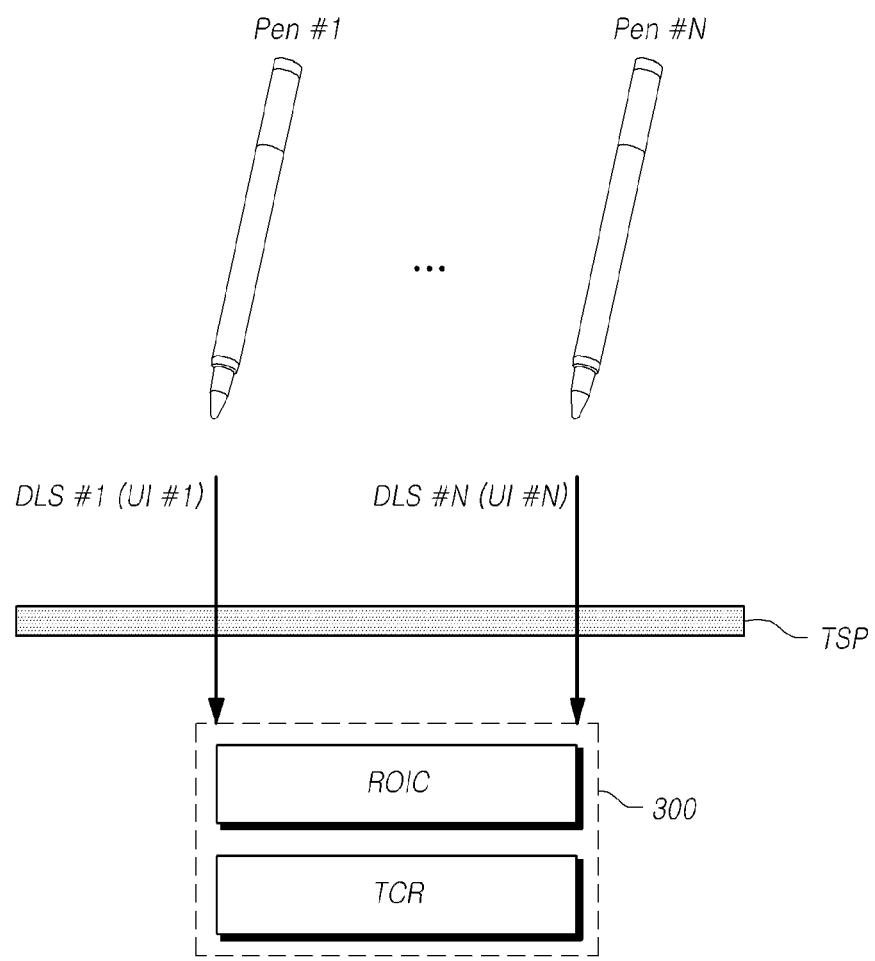
FIG. 12 is a diagram illustrating pen driving and pen recognition processing using downlink signals having distinguishable unique information for multi-pen sensing of the touch display device according to aspects of the present disclosure.

FIG. 12 is a diagram illustrating pen driving and pen recognition processing using a downlink signal (DLS) having pieces of Unique Information (UI), which are distinguished from each other, for multi-pen sensing of the touch display device 10 according to aspects of the present disclosure.

For multi-pen sensing of the touch display device 10 according to aspects of the present disclosure, the touch display device 10 has to distinguish a plurality of pens.

To this end, two or more pens (Pen #1 to Pen #N) (N being a natural number larger than or equal to 2) may output downlink signals (DLS #1 to DLS #N) having different pieces of unique information (UI #1 to UI #N).

Accordingly, the touch circuit 300 may receive the downlink signals (DLS #1 to DLS #N) output from the two or more pens (Pen #1 to Pen #N) through one or more touch electrodes (TE) on the touch panel (TSP) and sense the two or more pens (Pen #1 to Pen #N) such that the pens are distinguished based on the unique information (UI #1 to UI #N) of the received downlink signals (DLS #1 to DLS #N).

As described above, since the two or more pens (Pen #1 to Pen #N) output the downlink signals (DLS #1 to DLS #N) having different pieces of unique information (UI #1 to UI #N), the touch circuit 300 may distinguishably recognize the two or more pens (Pen #1 to Pen #N) even though touches are simultaneously generated by the two or more pens (Pen #1 to Pen #N). That is, the touch circuit 300 may accurately identify the pen from which the received pen signal is output and use the signal for pen sensing. Accordingly, it is possible to perform accurate pen input processing for the two or more pens (Pen #1 to Pen #N).

The unique information (UI #1 to UI #N) of the downlink signals (DLS #1 to DLS #N) output from the two or more pens (Pen #1 to Pen #N) may correspond to pen IDs (pen identification information) of the two or more pens (Pen #1 to Pen #N).

The first circuit (ROIC) included in the touch circuit 300 may receive the downlink signals (DLS #1 to DLS #N) output from the two or more pens (Pen #1 to Pen #N) through the touch panel (TSP).

The second circuit (TCR) included in the touch circuit 300 may sense the two or more pens (Pen #1 to Pen #N) such that the pens are distinguished based on the unique information (UI #1 to UI #N) of the downlink signals (DLS) received by the first circuit (ROIC).

Meanwhile, before outputting the downlink signals (DLS #1 to DLS #N) having different pieces of unique information (UI #1 to UI #N), the two or more pens (Pen #1 to Pen #N) should determine the unique information (UI #1 to UI #N) of the downlink signals (DLS #1 to DLS #N) to be output.

Each of the two or more pens (Pen #1 to Pen #N) may independently determine the unique information.

Alternatively, the two or more pens (Pen #1 to Pen #N) may determine the unique information such that the unique information does not overlap through communication with each other.

Alternatively, the two or more pens (Pen #1 to Pen #N) may determine the unique information (UI #1 to UI #N) by receiving information required for determining the unique information from the touch display device 10 through the uplink signals (ULS).

When the touch circuit 300 applies the uplink signal (ULS) to the touch panel (TSP), uplink signals (ULS) applied to one or more of the plurality of touch electrodes (TE) are transferred to the two or more pens (Pen #1 to Pen #N) in contact with or in proximity to the touch panel (TSP).

Accordingly, the two or more pens (Pen #1 to Pen #N) may output the downlink signals (DLS #1 to DLS #N) having different pieces of unique information (UI #1 to UI #N) in response to the uplink signals (ULS) applied to the touch panel (TSP).

Therefore, the unique information (UI #1 to UI #N) of the downlink signals (DLS #1 to DLS #N) output from the two or more pens (Pen #1 to Pen #N) may be information assigned by the touch circuit 300 or information determined based on information provided from the touch circuit 300.

As described above, the touch display device 10 may accurately and effectively perform multi-pen sensing by allowing the two or more pens (Pen #1 to Pen #N) to configure the unique information (UI #1 to UI #N) distinguished from each other.

As described above, in order to perform the multi-pen sensing operation after distinguishably recognizing the two or more pens (Pen #1 to Pen #N), the touch circuit 300 of the touch display device 10 may output one or more uplink signals (ULS) containing all pieces of information to be transferred to the two or more pens (Pen #1 to Pen #N) during one or more touch frame times.

Unlike this, the touch circuit 300 of the touch display device 10 may output one or more uplink signal (ULS) corresponding to the two or more pens (Pen #1 to Pen #N) at different timings (for example, different LHBs) during one or more touch frame times.

For example, when there are a first pen (Pen #1) and a second pen (Pen #2), the touch circuit 300 may transmit a first uplink signal such as a beacon signal or a ping signal to the first pen (Pen #1) at first timing and transmit a second uplink signal such as a beacon signal or a ping signal to the second pen (Pen #2) at second timing different from the first timing.

The first uplink signal may include information required for driving the first pen (Pen #1) or a signal required for driving synchronization of the first pen (Pen #1). The second uplink signal may include information required for driving the second pen (Pen #2) or a signal required for driving synchronization of the second pen (Pen #2).

The first timing and the second timing exist on different time zones, or coexist within one touch frame or one display frame.

Unlike this, the first timing and the second timing may exist on different touch frames or different display frames.

A more detailed description will be made below.

The touch circuit 300 outputs the uplink signal (ULS) containing available unique information (AUI).

Accordingly, the uplink signal (ULS) containing the available unique information (AUI) is applied to the touch panel (TSP).

The two or more pens (Pen #1 to Pen #N) may receive the uplink signals (ULS) applied to the touch panel (TSP) through pen tips and output the downlink signals (DLS #1 to DLS #N) having different pieces of unique information (UI #1 to UI #N) according to the available unique information (AUI) recognized through the uplink signal (ULS).

Meanwhile, in order to configure the different pieces of unique information (UI #1 to UI #N) used by the two or more pens (Pen #1 to Pen #N), the two or more pens (Pen #1 to Pen #N) may receive available unique information (AUI) that is information required for determining the unique information from the touch circuit 300 through the uplink signals (ULS) at different timings and configure the unique information (UI #1 to UI #N) at different timings.

Meanwhile, the touch circuit 300 may store and manage unique information that is currently used by the pen and unique information that can be used by the pen in the future, and update the currently used unique information and the available unique information whenever a new pen is recognized.

Figure 13A:
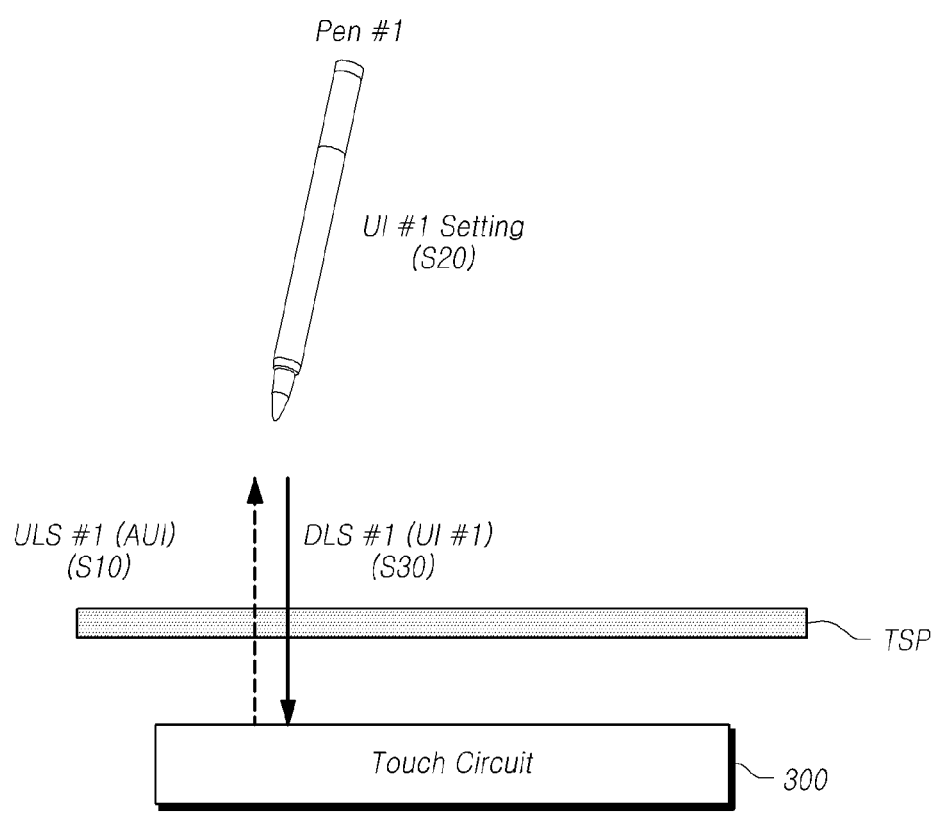
FIGS. 13A to 13C illustrate processes of outputting downlink signals having unique information for distinguishing a plurality of pens for multi-pen sensing of the touch display device according to aspects of the present disclosure.
Figure 13B:
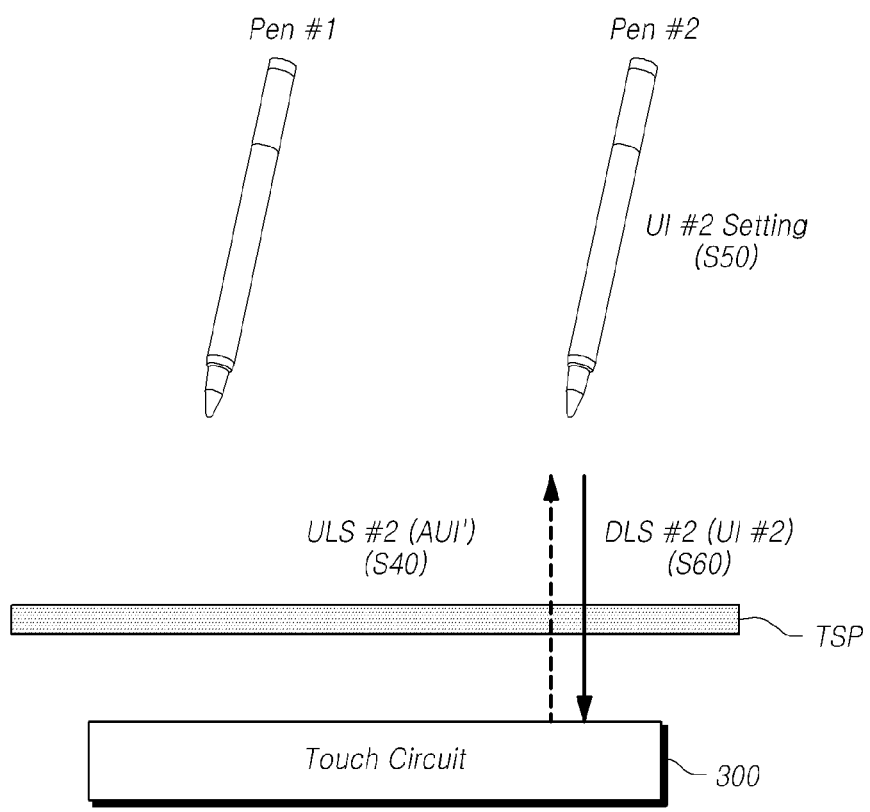
Figure 13C:
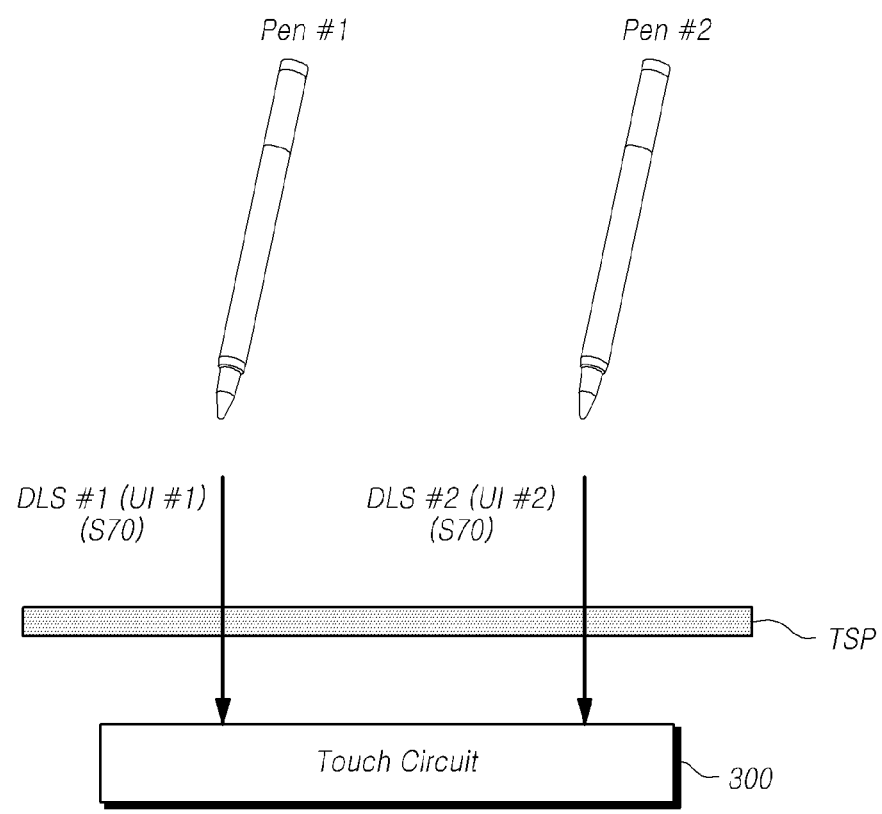

FIGS. 13A to 13C illustrate processes of outputting downlink signals (DLS #1 and DLS #2) having unique information (UI #1 and UI #2) for distinguishing two pens (Pen #1 and Pen #2) for multi-pen sensing of the touch display device 10 according to aspects of the present disclosure.

Referring to FIG. 13A, the touch circuit 300 supplies the uplink signal (ULS #1) containing available unique information (AUI) to the touch panel (TSP), and the first pen (Pen #1) in contact with or in proximity to the touch panel (TSP) receives the uplink signal (ULS #1) supplied to the touch panel (TSP) through a pen tip in S10. At this time, the second pen (Pen #2) is neither in contact with nor in proximity to the touch panel (TSP).

For example, the uplink signal (ULS #1) transmitted to the first pen (Pen #1) may be a beacon signal.

Further, the uplink signal (ULS #1) may be a signal expressing a DSSS code. The DSSS code expressed by the uplink signal (ULS #1) may be a code expressing available unique information (AUI).

The first pen (Pen #1) may grasp available unique information (AUI) through the received uplink signal (ULS #1) and configure unique information (UI #1) according to the grasped available unique information (AUI) in S20.

For example, the first pen (Pen #1) may configure the unique information (UI #1) to be used for a pen identification purpose by extracting the unique information (UI #1) corresponding to the available unique information (AUI) with reference to a memory (not shown).

The first pen (Pen #1) may output the downlink signal (DLS #1) having the unique information (UI #1) determined according to the grasped available unique information (AUI). The downlink signal (DLS #1) having the unique information (UI #1) output from the first pen (Pen #1) may be applied to the touch panel (TSP), and the touch circuit 300 may receive the downlink signal (DLS #1) having the unique information (UI #1) applied to the touch panel (TSP) and recognize the first pen (Pen #1) in S30.

Thereafter, the touch circuit 300 may update the available unique information (AUI) transmitted in S10.

That is, the first circuit (ROIC) or the second circuit (TCR) included in the touch circuit 300 may update the pre-stored available unique information (AUI) upon receiving the downlink signal (DLS #1) having the unique information (UI #1) output from the first pen (Pen #1) in contact with or in proximity to the touch panel (TSP).

Thereafter, when a new second pen (Pen #2) is in contact with or in proximity to the touch panel (TSP) in a state in which the unique information (UI #1) for the pen identification purpose is configured in the first pen (Pen #1), the above-described process is repeated.

Referring to FIG. 13B, the touch circuit 300 supplies the uplink signal (ULS #2) containing available unique information (AUI') to the touch panel (TSP), and the second pen (Pen #2) in contact with or in proximity to the touch panel (TSP) receives the uplink signal (ULS #2) supplied to the touch panel (TSP) through a pen tip in S40. At this time, the first pen (Pen #1) is continuously in contact with or in proximity to the touch panel (TSP).

The second pen (Pen #2) may grasp available unique information (AUI') through the received uplink signal (ULS #2) and configure unique information (UI #2) according to the grasped available unique information (AUI') in S50.

For example, the second pen (Pen #2) may configure the unique information (UI #2) to be used for a pen identification purpose by extracting the unique information (UI #2) corresponding to the available unique information (AUI') with reference to a memory (not shown).

The second pen (Pen #2) may output the downlink signal (DLS #2) having the unique information (UI #2) determined according to the grasped available unique information (AUI'). The downlink signal (DLS #2) having the unique information (UI #2) output from the second pen (Pen #2) may be applied to the touch panel (TSP), and the touch circuit 300 may receive the downlink signal (DLS #2) having the unique information (UI #2) applied to the touch panel (TSP) and recognize the second pen (Pen #2) in S60.

Thereafter, the first circuit (ROIC) or the second circuit (TCR) included in the touch circuit 300 may update the pre-stored available unique information (AUI') upon receiving the downlink signal (DLS #2) having the unique information (UI #2) output from the second pen (Pen #2) in contact with or in proximity to the touch panel (TSP).

Through the update of the available unique information, the unique information for identifying the pen may be accurately configured and the multi-pen may be accurately sensed.

After steps S10 to S60, even though the first pen (Pen #1) and the second pen (Pen #2) output the downlink signals (DLS #1 and DLS #2) at the same time, the touch circuit 300 may accurately distinguish and sense positions and additional information of the first pen (Pen #1) and the second pen (Pen #2) by grasping the unique information (UI #1 and UI #2) of the downlink signals (DLS #1 and DLS #2) output from the first pen (Pen #1) and the second pen (Pen #2) in S70.

Meanwhile, the touch circuit 300 may use a beacon signal, which is one of the uplink signals (ULS) when transferring the available unique information (AUI) to the pen.

That is, by supplying the beacon signal having the available unique information (AUI) to the touch panel (TSP), the touch circuit 300 may transfer the available unique information (AUI) to the pen in contact with or in proximity to the touch panel (TSP).

The beacon signal is one of the uplink signals (ULS) defined by a protocol between the touch panel (TSP) and the pen.

According to an example of FIG. 8, the beacon signal may be supplied to the touch panel (TSP) during one or more blank periods (LHB #1) corresponding to a beacon signal transmission period among a plurality of blank periods (LHB #1 to LHB #16) within one frame time (or touch frame time).

According to the above description, the touch circuit 300 may effectively and accurately transfer the available unique information (AUI) to the pen through the beacon signal which is one of the uplink signals (ULS).

Figure 14:
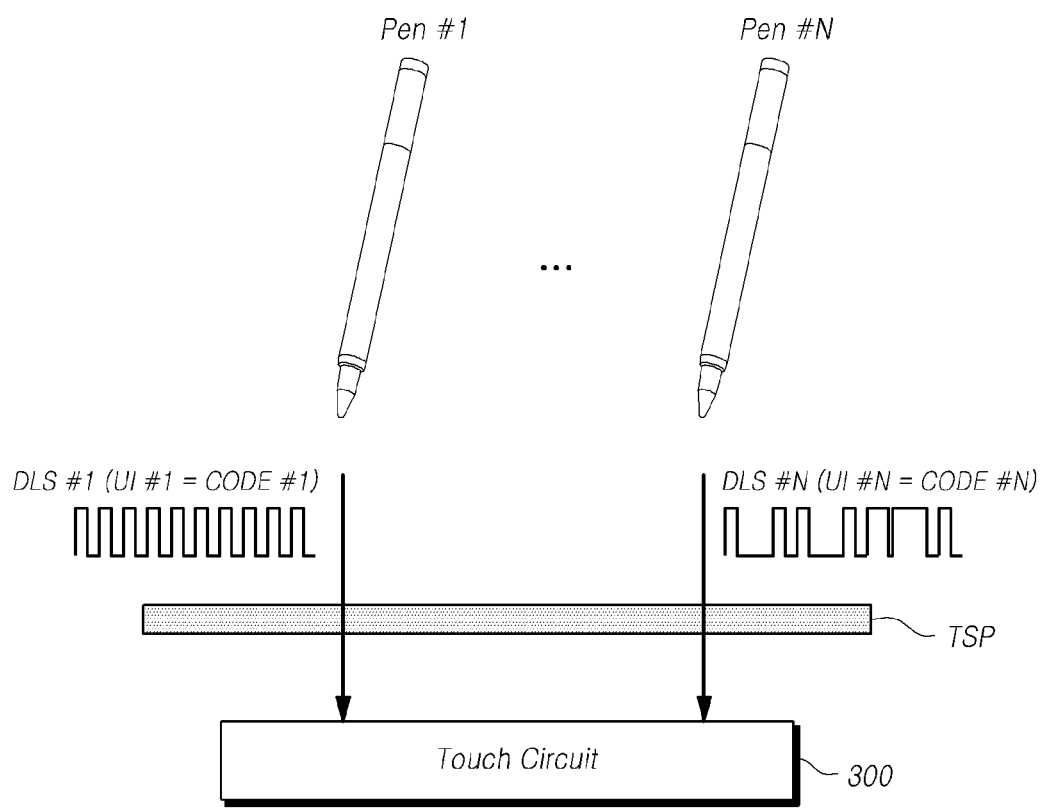
FIG. 14 is a diagram illustrating pen driving and pen recognition processing using downlink signals having distinguishable codes as distinguishable unique information for multi-pen sensing of the touch display device according to aspects of the present disclosure.
Figure 15:
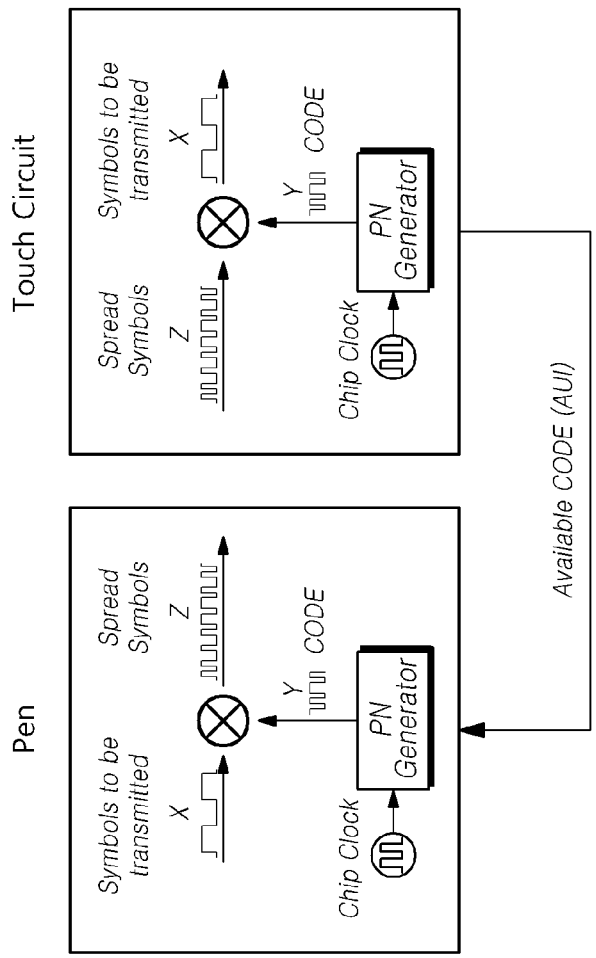
FIG. 15 is a diagram schematically illustrating direct sequence spread spectrum technology of the pen and the touch circuit when distinguishable codes are used as distinguishable unique information for multi-pen sensing of the touch display device according to aspects of the present disclosure.

FIG. 14 is a diagram illustrating pen driving and pen recognition processing using the downlink signals (DLS) having distinguishable codes as distinguishable unique information (UI) for multi-pen sensing of the touch display device 10 according to aspects of the present disclosure, and FIG. 15 is a diagram schematically illustrating direct sequence spread spectrum technology of the pen and the touch circuit 300 when distinguishable codes are used as distinguishable unique information (UI) for multi-pen sensing of the touch display device 10 according to aspects of the present disclosure.

As described above, the two or more pens (Pen #1 to Pen #N) may output the downlink signals (DLS #1 to DLS #N) having different pieces of unique information (UI #1 to UI #N).

As illustrated in FIG. 14, the downlink signals (DLS #1 to DLS #N) having different pieces of unique information (UI #1 to UI #N) may be code signals (CODE #1 to CODE #N) which are distinguished from each other.

That is, the unique information (UI #1 to UI #N) of the downlink signals (DLS #1 to DLS #N) output from the two or more pens (Pen #1 to Pen #N) may correspond to unique codes (CODE #1 to CODE #N) expressed by the downlink signals (DLS #1 to DLS #N) output from the two or more pens (Pen #1 to Pen #N).

As described above, the two or more pens (Pen #1 to Pen #N) output the downlink signals (DLS #1 to DLS #N) having the unique codes (CODE #1 to CODE #N) corresponding to different pieces of unique information (UI #1 to UI #N), thereby reducing an influence of noise by another signal and thus more accurately perform multi-pen sensing through more accurate code distinguishment.

Meanwhile, the unique codes (CODE #1 to CODE #N) expressed by the downlink signals (DLS #1 to DLS #N) output from the two or more pens (Pen #1 to Pen #N) may be, for example, direct sequence spread spectrum codes (DSSS codes) orthogonal to each other.

The DSSS code may be a pseudo-random noise sequence for spectrum spread using direct sequence spread spectrum technology.

The pseudo-random noise sequence is a digital signal having a higher frequency than the original signal (symbol) and may be referred to a Pseudo Noise (PN) code or a spread code.

According to the above description, the pen should output the downlink signals (DLS) in the form of DSSS codes corresponding to unique information (UI) based on the direct sequence spread spectrum technology, and the touch circuit 300 should receive the downlink signals (DLS) expressed by the DSSS codes and decode the DSSS codes.

This will be briefly described with reference to FIG. 15.

Referring to FIG. 15, the pen may spectrum-spread a signal (X) containing information (for example, additional pen information) to be transmitted through a Pseudo Noise (PN) code (Y) generated by a PN generator and wirelessly transmit the spectrum-spread signal (Z).

The PN code (Y) may be a unique code corresponding to the unique information (UI) for identifying a pen. A spectrum-spread signal (Z) wirelessly transmitted from the pen is a downlink signal (DLS).

The PN code generator generates the PN code (Y) consisting of a plurality of bit sequences through a chip clock having a chip clock period (Tc).

The PN code (Y) used by the pen may be equally used when the touch circuit 300 of the touch display device 10 demodulates a signal.

The touch circuit 300 of the touch display device 10 may perform demodulation through an inverse method of the modulation method of the pen.

The touch circuit 300 of the touch display device 10 may receive the signal wirelessly transmitted from the pen through the touch panel (TSP), demodulate the received signal (Z) through the PN code (Y) generated by the PN generator, distinguishably recognize pens through the demodulated signal (X), and acquire information which the pen desires to transmit.

Meanwhile, the pen uses the same PN code (Y) as the PN code (Y) generated by the PN generator within the touch circuit 300 of the touch display device 10.

To this end, the touch display device 10 may transmit an available code corresponding to available unique information (AUI) to the pen through the uplink signal (ULS).

The uplink signal (ULS) may be a signal expressing the available code, that is, a DSSS code.

The uplink signal (ULS) may be a beacon signal.

As described above, the pen may output the downlink signal (DLS) in the form of DSSS code corresponding to unique information (UI) and, the touch circuit 300 may receive the downlink signal (DLS) expressed by the DSSS code to distinguishably recognize the pen, so an influence of noise by another signal may be reduced. Accordingly, it is possible to more accurately distinguish pens and also further increase power efficiency and bandwidth efficiency.

Figure 16:
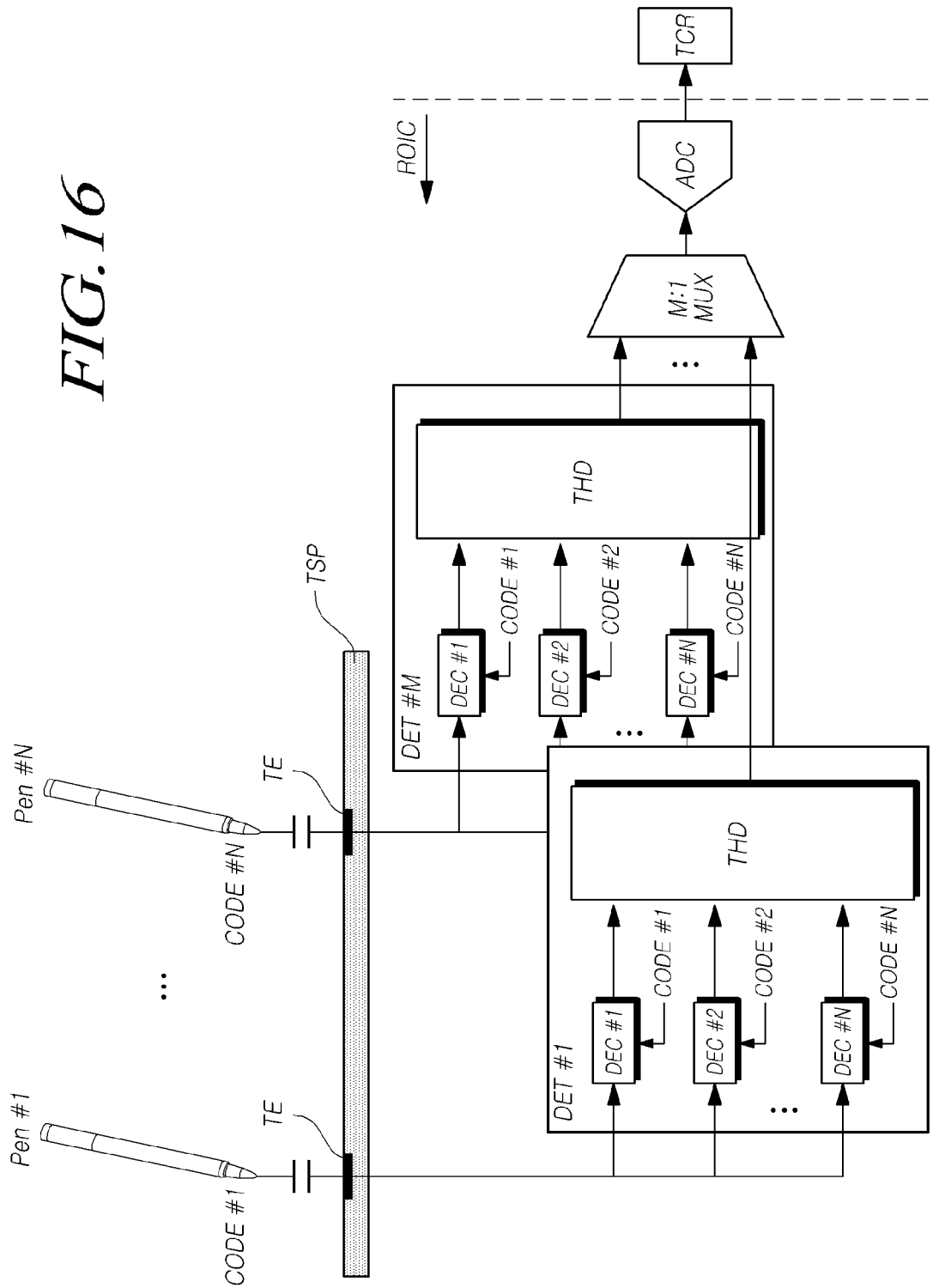
FIGS. 16 and 17 illustrate the touch circuit when downlink signals having distinguishable codes as distinguishable unique information are used for multi-pen sensing of the touch display device according to aspects of the present disclosure.
Figure 17:
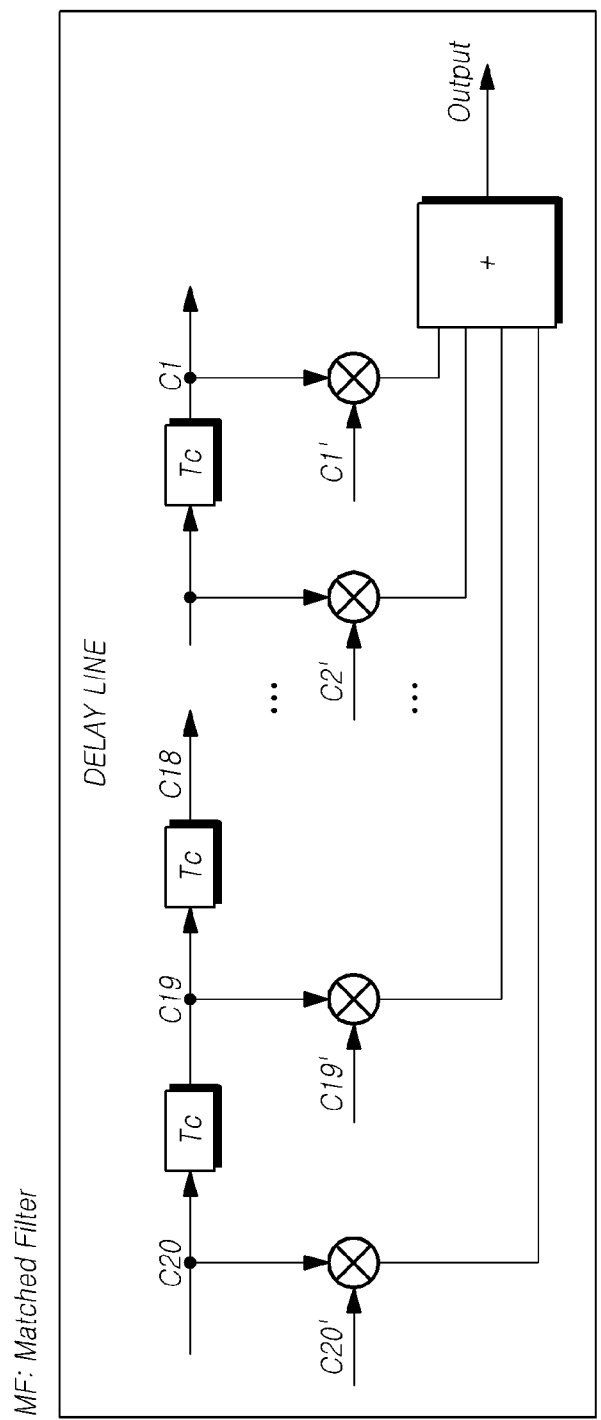
Figure 18:
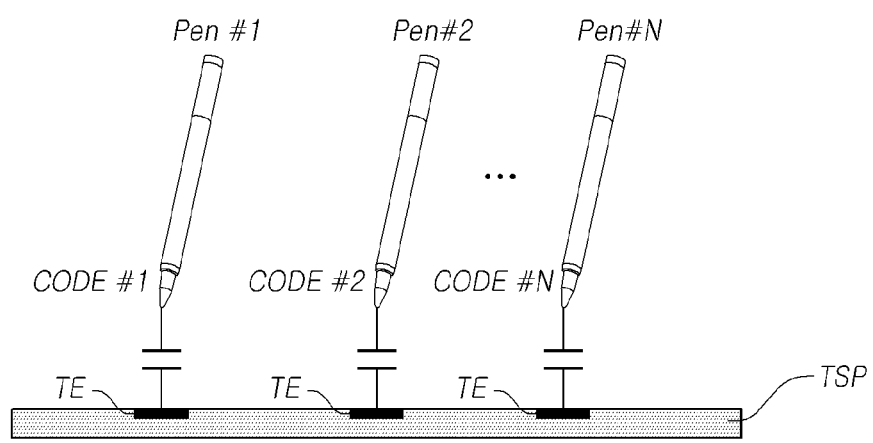
FIG. 18 illustrates downlink signals output from a plurality of pens for multi-pen sensing of the touch display device according to aspects of the present disclosure.
Figure 18:
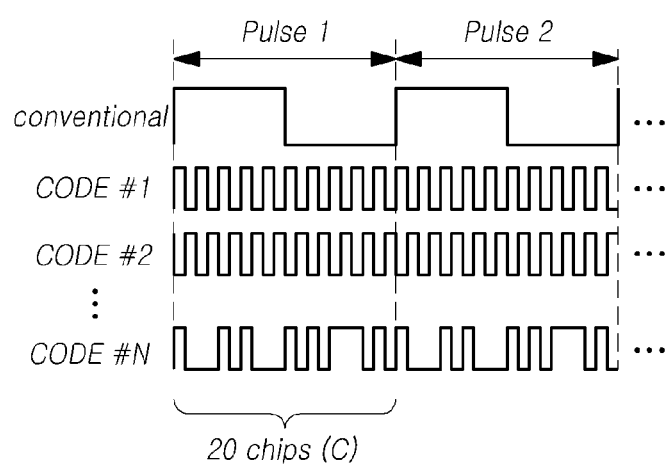

FIGS. 16 and 17 illustrate the touch circuit 300 when downlink signals (DNS #1 to DNS #N) having distinguishable codes (CODE #1 to CODE #N) as distinguishable unique information (UI) are used for multi-pen sensing of the touch display device 10 according to aspects of the present disclosure, and FIG. 18 illustrates downlink signals (DLS) output from two or more pens (Pen #1 to Pen #N) for multi-pen sensing of the touch display device 10 according to aspects of the present disclosure.

Referring to FIG. 16, the first circuit (ROIC) of the touch circuit 300 may include M detection circuits (DET #1 to DET #M) connected to M (M being a natural number larger than or equal to 2) touch electrodes (TE) within the touch panel (TSP), one or more multiplexers (MUX) for selectively outputting output voltages output from the M detection circuits (DET #1 to DET #M), and an analog-to-digital converter (ADC) for converting the output voltages selectively output from the one or more multiplexers (MUX) into digital values and outputting the converted digital values.

When the number of multiplexers (MUX) corresponding to the M detection circuits (DET #1 to DET #M) is one, the multiplexer (MUX) may be an M:1 multiplexer (M:1 MUX).

Each of the M detection circuits (DET #1 to DET #M) may include a decoder circuit including N decoders (DEC #1 to DEC #N) for identifying whether unique information (UI) of the downlink signal (DLS) received from the corresponding touch electrode (TE) among the M touch electrodes (TE) is contained in an already known unique information list, and a detector (THD) for outputting a voltage of the unique information (UI) of the downlink signal (DLS) received from the corresponding touch electrode (TE).

The N decoders (DEC #1 to DEC #N) simultaneously receive the downlink signal (DLS) received from one touch electrode (TE). N is the number of all unique codes used.

When the unique information (UI) is a unique code such as a DSSS code, the N decoders (DEC) multiply the unique code (CODE) expressed by the downlink signal (DLS) received from the corresponding touch electrode (TE) and already known unique codes in order to identify whether the unique code (CODE) expressed by the downlink signal (DLS) received from the corresponding touch electrode (TE) is contained in the already known unique information list (that is, unique code list).

For example, in FIG. 16, the first pen (Pen #1) performs spectrum spread modulation (for example, DSSS modulation) using a first code (CODE #1) corresponding to unique information (UI) and outputs the spectrum-spread signal as the downlink signal (DLS).

At this time, when information multiplied by the first code (CODE #1) is 1 in spectrum spread (see FIG. 15), the spectrum spread signal corresponding to the downlink signal (DLS) may be the first code (CODE #1) itself.

Accordingly, in the first circuit (ROIC) of the touch circuit 300, the N decoders (DEC #1 to DEC #N) within the first detection circuit (DET #1), which are simultaneously connected to the M detection circuits (DET #1 to DET #M), receive the same spectrum spread signal, which is the downlink signal (DLS) from the one first touch electrode (TE). N is the number of all unique codes used.

Each of the N decoders (DEC #1 to DEC #N) performs decoding processing by using one of the already known N unique codes (CODE #1 to CODE #N).

For example, the first decoder (DEC #1) among the N decoders (DEC #1 to DEC #N) may perform calculation processing by multiplying the received spectrum spread signal (CODE #1) and the first unique code (CODE #1) corresponding to the first decoder (DEC #1) among the already known unique codes (CODE #1 to CODE #N).

For convenience of description, when the received spectrum spread signal (CODE #1) is 1, the first unique code (CODE #1) is the same as the received spectrum spread signal (CODE #1), so that a voltage output from the first decoder (DEC #1) may be a voltage corresponding to 1.

The second decoder (DEC #2) may perform calculation processing by multiplying the received spectrum spread signal (CODE #1) and the second unique code (CODE #2) corresponding to the second decoder (DEC #2) among the already known unique codes (CODE #1 to CODE #N).

For convenience of description, when the received spectrum spread signal (CODE #1) is 1, the second unique code (CODE #2) is different from the received spectrum spread signal (CODE #1), so that a voltage output from the second decoder (DEC #2) may be a voltage corresponding to 0.

In the same way, the N-th decoder (DEC #N) may perform calculation processing by multiplying the received spectrum spread signal (CODE #1) and the N-th unique code (CODE #N) corresponding to the N-th decoder (DEC #N) among the already known unique codes (CODE #1 to CODE #N).

For convenience of description, when the received spectrum spread signal (CODE #1) is 1, the N-th unique code (CODE #N) is different from the received spectrum spread signal (CODE #1), so that a voltage output from the N-th decoder (DEC #N) may be a voltage corresponding to 0.

Accordingly, at least one of the voltages output from the N decoders (DEC #1 to DEC #N) may be the voltage corresponding to 1.

The detector (THD) may compare the voltages input from the N decoders (DEC #1 to DEC #N) with a threshold value and output a predefined voltage to the multiplexer (MUX) based on the comparison.

To describe again, each of the M detection circuits (DET #1 to DET #M) can be electrically connected to one touch electrode (TE). Each of the M detection circuits (DET #1 to DET #M) may comprise N decoders (DEC #1 to DEC #N) and the detector (THD).

The N decoders (DEC #1 to DEC #N) included in each of the M detection circuits (DET #1 to DET #M) receive the same downlink signal (DLS), perform decoding processing using a unique code assigned to each of the N decoders (DEC #1 to DEC #N), and output a voltage according to a result of the decoding processing. Each of the N decoders (DEC #1 to DEC #N) can output a relatively high voltage when the unique code of the received downlink signal (DLS) is the same as the unique code assigned to each of the N decoders (DEC #1 to DEC #N).

For example, when the first detection circuit (DET #1) receives a downlink signal (DLS) of CODE #1 through a touch electrode (TE), N decoders (DEC #1 to DEC #N) included in the first detection circuit (DET #1) receive the same downlink signal (DLS) of CODE #1, perform decoding processing using the unique code (CODE #1, . . . , CODE #N) assigned to each of the N decoders (DEC #1 to DEC #N), and output a voltage corresponding to the decoding result. At this time, the first decoder (DEC #1), to which the same unique code (CODE #1) as the unique code (CODE #1) of the downlink signal (DLS) is assigned, can output a relatively high voltage.

The detector (THD) included in each of the M detection circuits (DET #1 to DET #M) selects a voltage higher than the threshold value among the voltages input from the N decoders (DEC #1 to DEC #N) and outputs the unique voltage corresponding to the unique code used in the decoding process by the decoder outputting the selected high voltage to the multiplexer (MUX). The voltage output to the multiplexer (MUX) is converted to sensing data corresponding to the digital value through the analog-to-digital converter (ADC) and transferred to the second circuit (TCR).

In other words, any one or more (ex. DET #1) of the M detection circuits (DET #1 to DET #M) can convert the unique voltage corresponding to the unique code (CODE #1) of the received downlink signal (DLS) into a digital value and output it as sensing data. That is, the sensing data output from one or more (ex. DET #1) of the M detection circuits (DET #1 to DET #M) corresponds to a unique code (CODE #1) that is used uniquely as the unique information of the downlink signal (DLS). Therefore, the sensing data is information that can identify the unique code of the downlink signal (DLS), and is information that makes it possible to distinguish a plurality of pens (Pen #1~Pen #N).

Thus, the second circuit (TCR) can distinguish and recognize a plurality of pens based on the sensing data transmitted from each of the M detection circuits (DET #1 to DET #M). That is, the second circuit (TCR) can recognize how many pens (Pen #1~Pen #N) exist based on the sensing data transmitted from each of the M detection circuits (DET #1 to DET #M). Then, the second circuit (TCR) can distinguish the pens (Pen #1~Pen #N) from each other by checking the unique code used by the recognized pens (Pen #1~Pen #N) for transmission of the downlink signal (DLS) based on the sensing data.

For example, when N=3, three unique codes (CODE #1, CODE #2, CODE #3) are used as the unique information (UI) of the downlink signal (DLS) and the first detection circuit (DET #1) includes three decoders (DEC #1, DEC #2, DEC #3). It is assumed that the unique code of the downlink signal (DLS) applied to the touch electrode (TE) connected to the first detection circuit (DET #1) is CODE #1.

The first decoder (DEC #1) performs the decoding process (multiplication process) using the unique code (CODE #1) of the received downlink signal (DLS) and the allocated CODE #1. The unique code (CODE #1) of the received downlink signal (DLS) and the unique code (CODE #1) assigned to the first decoder (DEC #1) are the same codes. Therefore, the first decoder (DEC #1) outputs a voltage (for example, 10 V) higher than a threshold value (for example, 5 V) as the decoding processing result. The second decoder (DEC #2) performs the decoding process (multiplication process) using the unique code (CODE #1) of the received downlink signal (DLS) and the allocated CODE #2. The unique code (CODE #1) of the received downlink signal (DLS) and the unique code (CODE #2) assigned to the second decoder (DEC #2) are different codes. Therefore, the second decoder (DEC #2) outputs a voltage (for example, 4 V) lower than the threshold value (for example, 5 V) as the decoding processing result. The third decoder (DEC #3) performs the decoding process (multiplication process) using the unique code (CODE #1) of the received downlink signal (DLS) and the allocated CODE #3. The unique code (CODE #1) of the received downlink signal (DLS) and the unique code (CODE #3) assigned to the third decoder (DEC #3) are different codes. Therefore, the third decoder (DEC #3) outputs a voltage (for example, 3 V) lower than the threshold value (for example, 5 V) as the decoding processing result.

The detector (THD) selects a voltage (10 V; the voltage input from the first decoder (DEC #1)) higher than the threshold value (5 V) among the voltages (10 V, 4 V, and 3 V) input from the three decoders (DEC #1, DEC #2, and DEC #3). From the connection relationship with the three decoders (DEC #1, DEC #2, DEC #3), the detector (THD) can know that the selected voltage (10V) is the voltage input from the first decoder (DEC #1). Therefore, the detector (THD) can output a predefined voltage (for example, 1 V) corresponding to CODE #1, which is a unique code assigned to the first decoder (DEC #1).

For another example, when N=3, three unique codes (CODE #1, CODE #2, CODE #3) are used as the unique information (UI) of the downlink signal (DLS) and the first detection circuit (DET #1) includes three decoders (DEC #1, DEC #2, DEC #3). It is assumed that the unique code of the downlink signal (DLS) applied to the touch electrode (TE) connected to the first detection circuit (DET #1) is CODE #2.

The first decoder (DEC #1) performs the decoding process (multiplication process) using the unique code (CODE #2) of the received downlink signal (DLS) and the allocated CODE #1. The unique code (CODE #2) of the received downlink signal (DLS) and the unique code (CODE #1) assigned to the first decoder (DEC #1) are different codes. Therefore, the first decoder (DEC #1) outputs a voltage (for example, 3.7 V) lower than the threshold value (for example, 5 V) as the decoding processing result. The second decoder (DEC #2) performs the decoding process (multiplication process) using the unique code (CODE #2) of the received downlink signal (DLS) and the allocated CODE #2. The unique code (CODE #2) of the received downlink signal (DLS) and the unique code (CODE #2) assigned to the second decoder (DEC #2) are the same codes. Therefore, the second decoder (DEC #2) outputs a voltage (for example, 8V) higher than the threshold value (for example, 5 V) as the decoding processing result. The third decoder (DEC #3) performs the decoding process (multiplication process) using the unique code (CODE #2) of the received downlink signal (DLS) and the allocated CODE #3. The unique code (CODE #2) of the received downlink signal (DLS) and the unique code (CODE #3) assigned to the third decoder (DEC #3) are different codes. Therefore, the second decoder (DEC #3) outputs a voltage (for example, 2.1 V) lower than the threshold value (for example, 5 V) as the decoding processing result.

The detector (THD) selects a voltage (8 V; the voltage input from the second decoder (DEC #2)) higher than the threshold value (5 V) among the voltages (3.7 V, 8 V, and 2.1 V) input from the three decoders (DEC #1, DEC #2, and DEC #3). From the connection relationship with the three decoders (DEC #1, DEC #2, DEC #3), the detector (THD) can know that the selected voltage (8 V) is the voltage input from the second decoder (DEC #2). Therefore, the detector (THD) can output a predefined voltage (for example, 2 V) corresponding to CODE #2, which is a unique code assigned to the second decoder (DEC #2).

In the case of the first detection circuit (DET #1) in FIG. 16, information on the unique code (CODE #1) corresponding to the voltage higher than the threshold value may be stored in a memory (not shown), and the information stored in the memory may be referenced by the second circuit (TCR) and used for pen identification.

Through the touch circuit 300, a recognition rate having very high accuracy can be obtained when a plurality of pens are distinguishably recognized using DSSS codes as unique information (UI).

Referring to FIG. 17, each of the N decoders (DEC #1 to DEC #N) may be implemented as a filter such as a Matched Filter (MF).

Referring to FIGS. 17 and 18, in the case of the second decoder (DEC #2), the MF implementing the second decoder (DEC #2) may multiply (at this time, multiply while being delayed) a predetermined number (20 in the example of FIG. 18) of chips (C: C1 to C20) in the received spectrum spread signal (CODE #1) and a predetermined number (20 in the example of FIG. 18) of chips (C: C1' to C20') in the unique code (for example, CODE #2) corresponding to the second decoder (DEC #2), sum up the multiplied values, and output the sum.

Referring to FIG. 18, in comparison with the pulse waveform of the conventional pen signal, the same DSSS code signal may be repeated in every pulse section of the basic pen signal.

For example, the first DSSS code (CODE #1) having 20 chips (1010 1010 1010 1010 1010) in a first pulse section (Pulse 1) may be identically repeated in a second pulse section (Pulse 2).

For example, the second DSSS code (CODE #2) having 20 chips (0101 0101 0101 0101 0101) in the first pulse section (Pulse 1) may be identically repeated in the second pulse section (Pulse 2).

Figure 19:
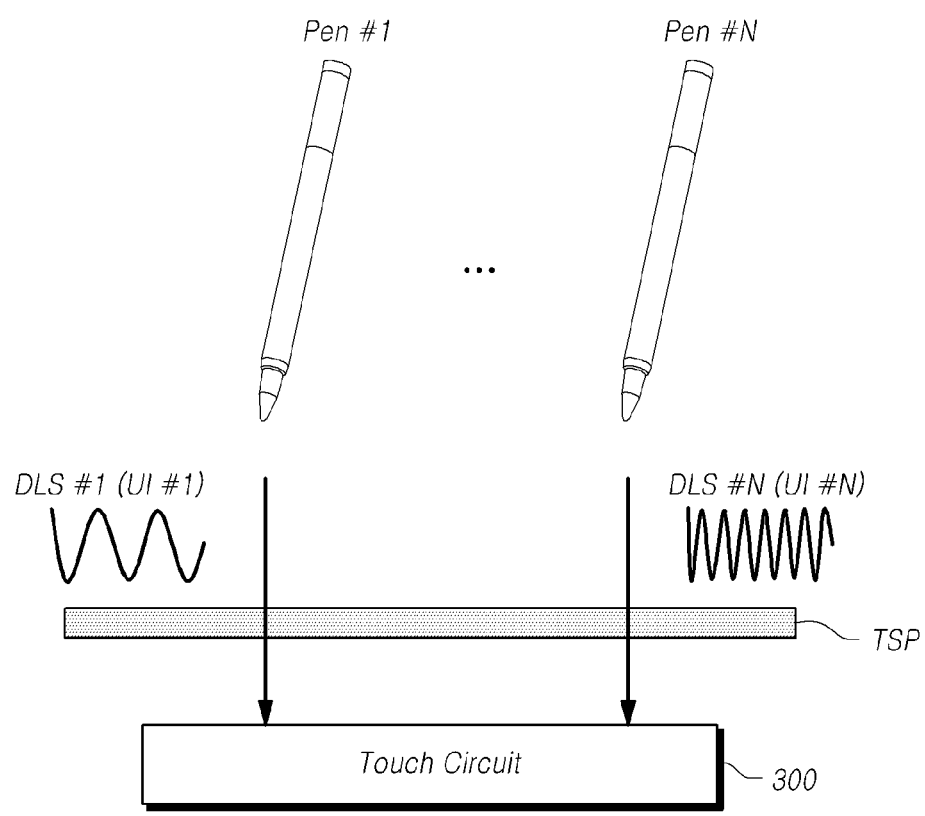
FIG. 19 is a diagram illustrating pen driving and pen recognition processing using downlink signals having distinguishable frequencies as distinguishable unique information for multi-pen sensing of the touch display device according to aspects of the present disclosure.

FIG. 19 is a diagram illustrating pen driving and pen recognition processing using the downlink signals (DLS) having distinguishable frequencies as distinguishable unique information (UI) for multi-pen sensing of the touch display device 10 according to aspects of the present disclosure.

As described above, the two or more pens (Pen #1 to Pen #N) may output the downlink signals (DLS #1 to DLS #N) having different pieces of unique information (UI #1 to UI #N).

As illustrated in FIG. 19, the downlink signals (DLS #1 to DLS #N) having different pieces of unique information (UI #1 to UI #N) may have frequencies distinguished from each other.

That is, the unique information (UI #1 to UI #N) of the downlink signals (DLS #1 to DLS #N) output from the two or more pens (Pen #1 to Pen #N) may be unique frequencies (FREQ #1 to FREQ #N) of the downlink signals (DLS #1 to DLS #N) output from the two or more pens (Pen #1 to Pen #N).

As described above, since the two or more pens (Pen #1 to Pen #N) output the downlink signals (DLS #1 to DLS #N) having the unique frequencies (FREQ #1 to FREQ #N) corresponding to the different pieces of unique information (UI #1 to UI #N), the touch circuit 300 may distinguishably recognize the two or more pens (Pen #1 to Pen #N) through distinguishment between the frequencies.

Figure 20:
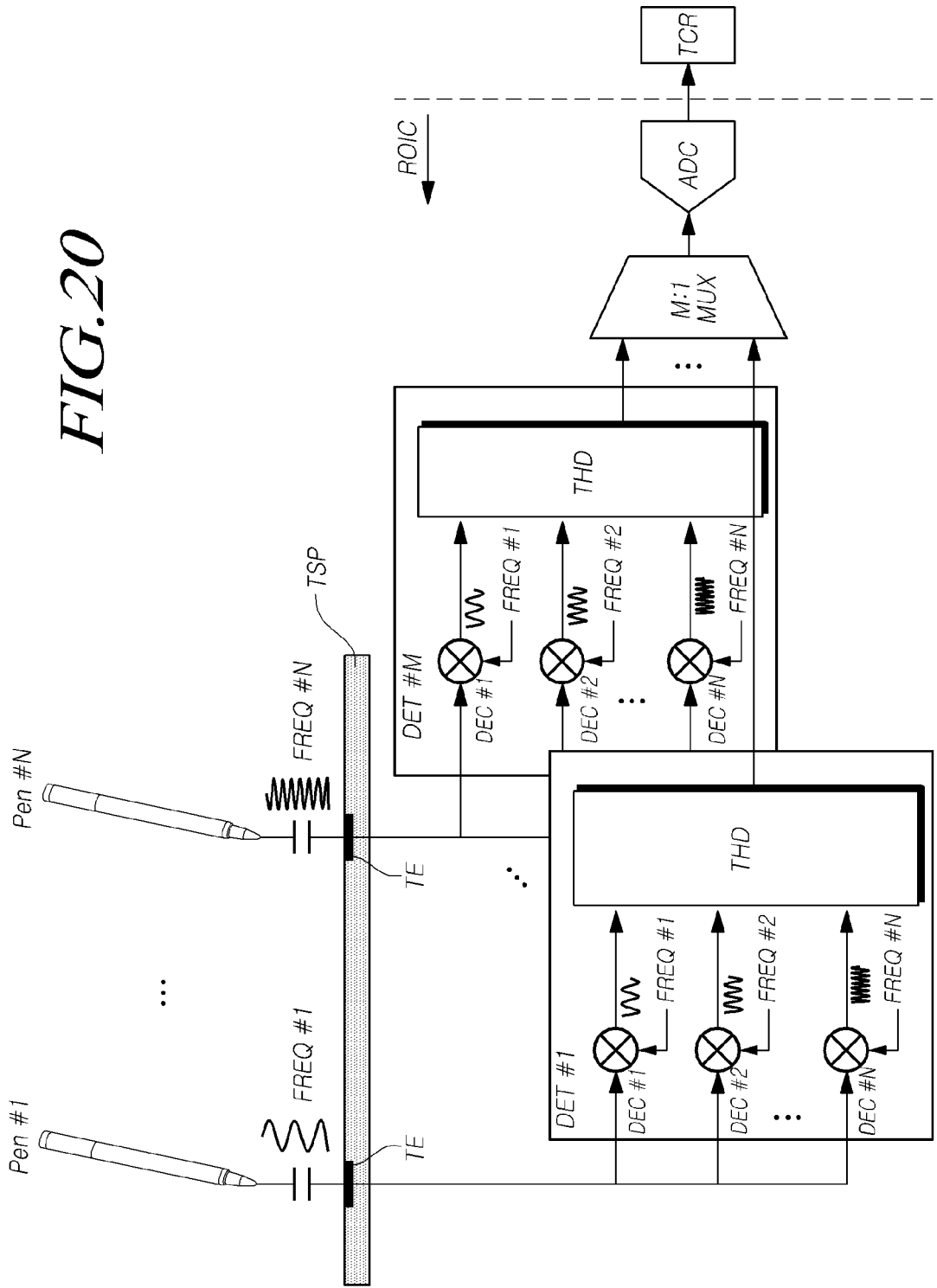
FIG. 20 illustrates the touch circuit when downlink signals having distinguishable frequencies as distinguishable unique information are used for multi-pen sensing of the touch display device according to aspects of the present disclosure.
Figure 21:
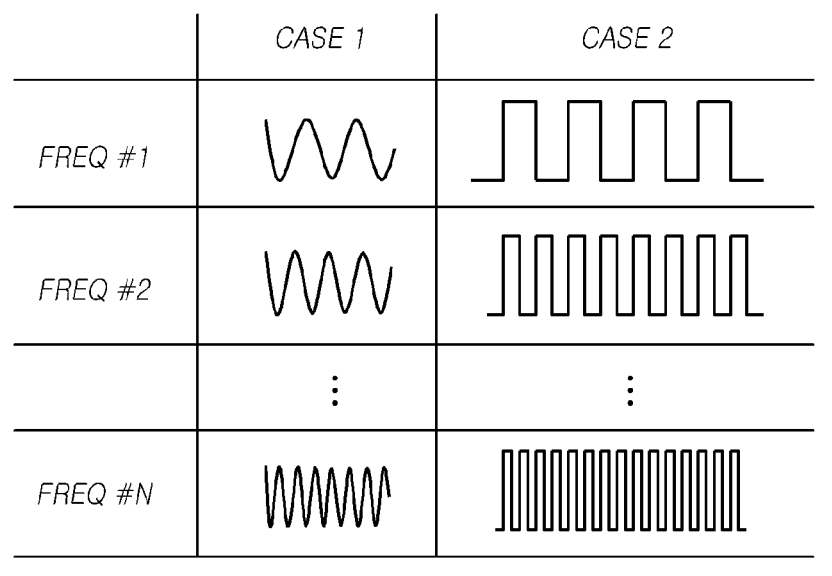

FIG. 20 illustrates the touch circuit 300 when the downlink signals (DLS) having distinguishable frequencies as distinguishable unique information (UI) are used for multi-pen sensing of the touch display device 10 according to aspects of the present disclosure, and FIG. 21 illustrates frequencies (FREQ #1 to FREQ #N) distinguished from each other when the downlink signals (DLS) having distinguishable frequencies (FREQ #1 to FREQ #N) as distinguishable unique information (UI) are used for multi-pen sensing of the touch display device 10 according to aspects of the present disclosure.

The first circuit (ROIC) within the touch circuit 300 illustrated in FIG. 20 has the basic configuration which is the same as that of the first circuit (ROIC) illustrated in FIG. 16.

Referring to FIG. 20, the first circuit (ROIC) of the touch circuit 300 may include M detection circuits (DET #1 to DET #M) connected to M (M being a natural number larger than or equal to 2) touch electrodes (TE) within the touch panel (TSP), one or more multiplexers (MUX) for selectively outputting output voltages output from the M detection circuits (DET #1 to DET #M), and an analog-to-digital converter (ADC) for converting the output voltages selectively output from the one or more multiplexers (MUX) into digital values and outputting the converted digital values.

When the number of multiplexers (MUX) corresponding to the M detection circuits (DET #1 to DET #M) is one, the multiplexer (MUX) may be an M:1 multiplexer (M:1 MUX).

Each of the M detection circuits (DET #1 to DET #M) may include a decoder circuit including N decoders (DEC #1 to DEC #N) for identifying whether unique information (UI) of the downlink signal (DLS) received from the corresponding touch electrode (TE) among the M touch electrodes (TE) is contained in an already known unique information list, and a detector (THD) for outputting a voltage of the unique information (UI) of the downlink signal (DLS) received from the corresponding touch electrode (TE).

The N decoders (DEC #1 to DEC #N) simultaneously receive the downlink signal (DLS) received from one touch electrode (TE). N is the number of all frequencies (FREQ #1 to FREQ #N) used.

When the unique information (UI) is a unique frequency, the N decoders (DEC) multiply the frequency of the downlink signal (DLS) received from the corresponding touch electrode (TE) and already known frequencies in order to identify whether the frequency of the downlink signal (DLS) received from the corresponding touch electrode (TE) is contained in the already known unique information list (that is, unique frequency list).

For example, in FIG. 20, the first pen (Pen #1) outputs the downlink signal (DLS) having the first frequency (FREQ #1) corresponding to the unique information (UI).

Accordingly, in the first circuit (ROIC) of the touch circuit 300, the N decoders (DEC #1 to DEC #N) within the first detection circuit (DET #1), which are simultaneously connected to the first touch electrode (TE), receive the same downlink signal (DLS) having the first frequency (FREQ #1) from the one first touch electrode (TE). N is the number of all unique frequencies used.

Each of the N decoders (DEC #1 to DEC #N) performs decoding processing by using one of the already known N unique frequencies (FREQ #1 to FREQ #N).

For example, the first decoder (DEC #1) among the N decoders (DEC #1 to DEC #N) may perform calculation processing by multiplying the received downlink signal (DLS) having the first frequency (FREQ #1) and a signal having the first frequency (FREQ #1) corresponding to the first decoder (DEC #1) among the already known unique frequencies (FREQ #1 to FREQ #N).

The second decoder (DEC #2) may perform calculation processing by multiplying the received downlink signal (DLS) having the first frequency (FREQ #1) and a signal having the second frequency (FREQ #2) corresponding to the second decoder (DEC #2) among the already known unique frequencies (FREQ #1 to FREQ #N).

The N-th decoder (DEC #N) may perform calculation processing by multiplying the received downlink signal (DLS) having the first frequency (FREQ #1) and a signal having the N-th frequency (FREQ #N) corresponding to the N-th decoder (DEC #N) among the already known unique frequencies (FREQ #1 to FREQ #N).

Accordingly, as the frequencies of the two signals, which are multiplied by each other, are the same for at least one of the N decoders (DEC #1 to DEC #N), said at least one of the N decoders (DEC #1 to DEC #N) may output a voltage higher than a threshold value.

The detector (THD) may compare the voltages input from the N decoders (DEC #1 to DEC #N) with the threshold value and output a predefined voltage to the multiplexer (MUX) based on the comparison.

To describe again, each of the M detection circuits (DET #1 to DET #M) can be electrically connected to one touch electrode (TE). Each of the M detection circuits (DET #1 to DET #M) may comprise N decoders (DEC #1 to DEC #N) and the detector (THD).

The N decoders (DEC #1 to DEC #N) included in each of the M detection circuits (DET #1 to DET #M) receive the same downlink signal (DLS), perform decoding processing using a unique frequency assigned to each of the N decoders (DEC #1 to DEC #N), and output a voltage according to a result of the decoding processing. Each of the N decoders (DEC #1 to DEC #N) can output a relatively high voltage when the unique frequency of the received downlink signal (DLS) is the same as the unique frequency assigned to each of the N decoders (DEC #1 to DEC #N).

For example, when the first detection circuit (DET #1) receives a downlink signal (DLS) of FREQ #1 through a touch electrode (TE), N decoders (DEC #1 to DEC #N) included in the first detection circuit (DET #1) receive the same downlink signal (DLS) of FREQ #1, perform decoding processing using the unique frequency (FREQ #1, . . . , FREQ #N) assigned to each of the N decoders (DEC #1 to DEC #N), and output a voltage corresponding to the decoding result. At this time, the first decoder (DEC #1), to which the same unique frequency (FREQ #1) as the unique frequency (FREQ #1) of the downlink signal (DLS) is assigned, can output a relatively high voltage.

The detector (THD) included in each of the M detection circuits (DET #1 to DET #M) selects a voltage higher than the threshold value among the voltages input from the N decoders (DEC #1 to DEC #N) and outputs the unique voltage corresponding to the unique frequency used in the decoding process by the decoder outputting the selected high voltage to the multiplexer (MUX). The voltage output to the multiplexer (MUX) is converted to sensing data corresponding to the digital value through the analog-to-digital converter (ADC) and transferred to the second circuit (TCR).

In other words, any one or more (ex. DET #1) of the M detection circuits (DET #1 to DET #M) can convert the unique voltage corresponding to the unique frequency (FREQ #1) of the received downlink signal (DLS) into a digital value and output it as sensing data. That is, the sensing data output from one or more (ex. DET #1) of the M detection circuits (DET #1 to DET #M) corresponds to a unique frequency (FREQ #1) that is used uniquely as the unique information of the downlink signal (DLS). Therefore, the sensing data is information that can identify the unique frequency of the downlink signal (DLS), and is information that makes it possible to distinguish a plurality of pens (Pen #1~Pen #N).

Thus, the second circuit (TCR) can distinguish and recognize a plurality of pens based on the sensing data transmitted from each of the M detection circuits (DET #1 to DET #M). That is, the second circuit (TCR) can recognize how many pens (Pen #1~Pen #N) exist based on the sensing data transmitted from each of the M detection circuits (DET #1 to DET #M). Then, the second circuit (TCR) can distinguish the pens (Pen #1~Pen #N) from each other by checking the unique frequency used by the recognized pens (Pen #1~Pen #N) for transmission of the downlink signal (DLS) based on the sensing data.

For example, when N=3, three unique frequencies (FREQ #1, FREQ #2, FREQ #3) are used as the unique information (UI) of the downlink signal (DLS) and the first detection circuit (DET #1) includes three decoders (DEC #1, DEC #2, DEC #3). It is assumed that the unique frequency of the downlink signal (DLS) applied to the touch electrode (TE) connected to the first detection circuit (DET #1) is FREQ #1.

The first decoder (DEC #1) performs the decoding process (multiplication process) using the unique frequency (FREQ #1) of the received downlink signal (DLS) and the allocated FREQ #1. The unique frequency (FREQ #1) of the received downlink signal (DLS) and the unique frequency (FREQ #1) assigned to the first decoder (DEC #1) are the same frequencies. Therefore, the first decoder (DEC #1) outputs a voltage (for example, 10 V) higher than a threshold value (for example, 5 V) as the decoding processing result. The second decoder (DEC #2) performs the decoding process (multiplication process) using the unique frequency (FREQ #1) of the received downlink signal (DLS) and the allocated FREQ #2. The unique frequency (FREQ #1) of the received downlink signal (DLS) and the unique frequency (FREQ #2) assigned to the second decoder (DEC #2) are different frequencies. Therefore, the second decoder (DEC #2) outputs a voltage (for example, 4 V) lower than the threshold value (for example, 5 V) as the decoding processing result. The third decoder (DEC #3) performs the decoding process (multiplication process) using the unique frequency (FREQ #1) of the received downlink signal (DLS) and the allocated FREQ #3. The unique frequency (FREQ #1) of the received downlink signal (DLS) and the unique frequency (FREQ #3) assigned to the third decoder (DEC #3) are different frequencies. Therefore, the third decoder (DEC #3) outputs a voltage (for example, 3 V) lower than the threshold value (for example, 5 V) as the decoding processing result.

The detector (THD) selects a voltage (10 V; the voltage input from the first decoder (DEC #1)) higher than the threshold value (5 V) among the voltages (10 V, 4 V, and 3 V) input from the three decoders (DEC #1, DEC #2, and DEC #3). From the connection relationship with the three decoders (DEC #1, DEC #2, DEC #3), the detector (THD) can know that the selected voltage (10V) is the voltage input from the first decoder (DEC #1). Therefore, the detector (THD) can output a predefined voltage (for example, 1 V) corresponding to FREQ #1, which is a unique frequency assigned to the first decoder (DEC #1).

For another example, when N=3, three unique frequencies (FREQ #1, FREQ #2, FREQ #3) are used as the unique information (UI) of the downlink signal (DLS) and the first detection circuit (DET #1) includes three decoders (DEC #1, DEC #2, DEC #3). It is assumed that the unique frequency of the downlink signal (DLS) applied to the touch electrode (TE) connected to the first detection circuit (DET #1) is FREQ #2.

The first decoder (DEC #1) performs the decoding process (multiplication process) using the unique frequency (FREQ #2) of the received downlink signal (DLS) and the allocated FREQ #1. And then, the first decoder (DEC #1) outputs a voltage (for example, 3.7 V) lower than the threshold value (for example, 5 V) as the decoding processing result. The second decoder (DEC #2) performs the decoding process (multiplication process) using the unique frequency (FREQ #2) of the received downlink signal (DLS) and the allocated FREQ #2. And then, the second decoder (DEC #2) outputs a voltage (for example, 8 V) higher than the threshold value (for example, 5 V) as the decoding processing result. The third decoder (DEC #3) performs the decoding process (multiplication process) using the unique frequency (FREQ #2) of the received downlink signal (DLS)

and the allocated FREQ #3. And then, the third decoder (DEC #3) outputs a voltage (for example, 2.1 V) lower than the threshold value (for example, 5 V) as the decoding processing result.

The detector (THD) selects a voltage (8 V; the voltage input from the second decoder (DEC #2)) higher than the threshold value (5 V) among the voltages (3.7 V, 8 V, and 2.1 V) input from the three decoders (DEC #1, DEC #2, and DEC #3). From the connection relationship with the three decoders (DEC #1, DEC #2, DEC #3), the detector (THD) can know that the selected voltage (8 V) is the voltage input from the second decoder (DEC #2). Therefore, the detector (THD) can output a predefined voltage (for example, 2 V) corresponding to FREQ #2, which is a unique frequency assigned to the second decoder (DEC #2).

In the case of the first detection circuit (DET #1) in FIG. 20, information on the first frequency (FREQ #1) corresponding to the voltage higher than the threshold value may be stored in a memory (not shown), and the information stored in the memory may be referenced by the second circuit (TCR) and used for pen identification.

Referring to FIG. 21, the downlink signals (DLS #1 to DLS #N) having the unique frequencies (FREQ #1 to FREQ #N) may be in the form of a sine wave like CASE 1, in the form of a square wave like CASE 2, or in various other waveforms such as a triangular wave.

Figure 22:
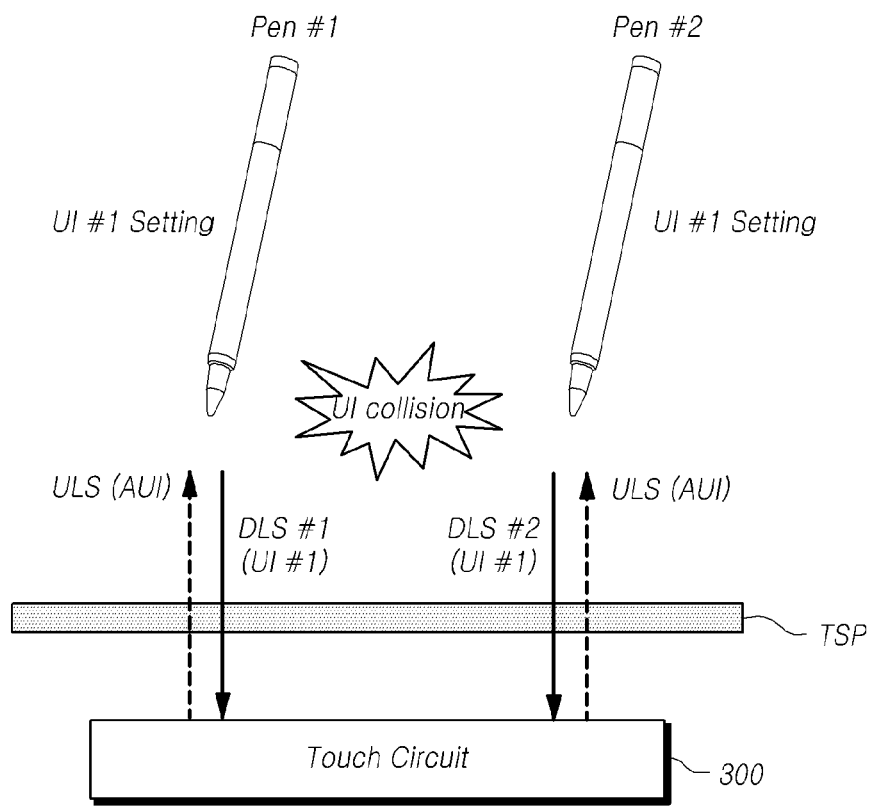
FIG. 22 illustrates a situation in which codes corresponding to unique information of downlink signals output from a plurality of pens overlap each other in multi-pen sensing of the touch display device according to aspects of the present disclosure.

FIG. 22 illustrates a situation in which codes corresponding to unique information (UI #1) of the downlink signals (DLS) output from two pens (Pen #1 and Pen #2) overlap each other in multi-pen sensing of the touch display device 10 according to aspects of the present disclosure.

Like in FIGS. 13A and 13C, when the two pens (Pen #1 and Pen #2) are sequentially in contact with or in proximity to the touch panel (TSP), the two pens (Pen #1 and Pen #2) may configure different pieces of unique information (UI #1 and UI #2) and use the information for driving the pens.

However, as illustrated in FIG. 22, when the two pens (Pen #1 and Pen #2) are in contact with or in proximity to the touch panel (TSP) at the same time point, the two pens (Pen #1 and Pen #2) may receive the same available unique information (AUI) from the touch panel (TSP) at the same time point, configure the same unique information (UI #1), and use the information for driving the pens.

In this case, the touch circuit 300 may receive the downlink signals (DLS #1 and DLS #2) having the same unique information (UI #1) from the two pens (Pen #1 and Pen #2) and thus cannot distinguishably recognize the two pens (Pen #1 and Pen #2).

That is, when the two pens (Pen #1 and Pen #2) are in contact with or in proximity to the touch panel (TSP) at the same time point, it may be impossible to perform multi-pen sensing due to collision of the unique information.

In order to handle the collision of the unique information, the unique information may be reset or reconfigured. This will be described with reference to FIG. 23.

Figure 23:
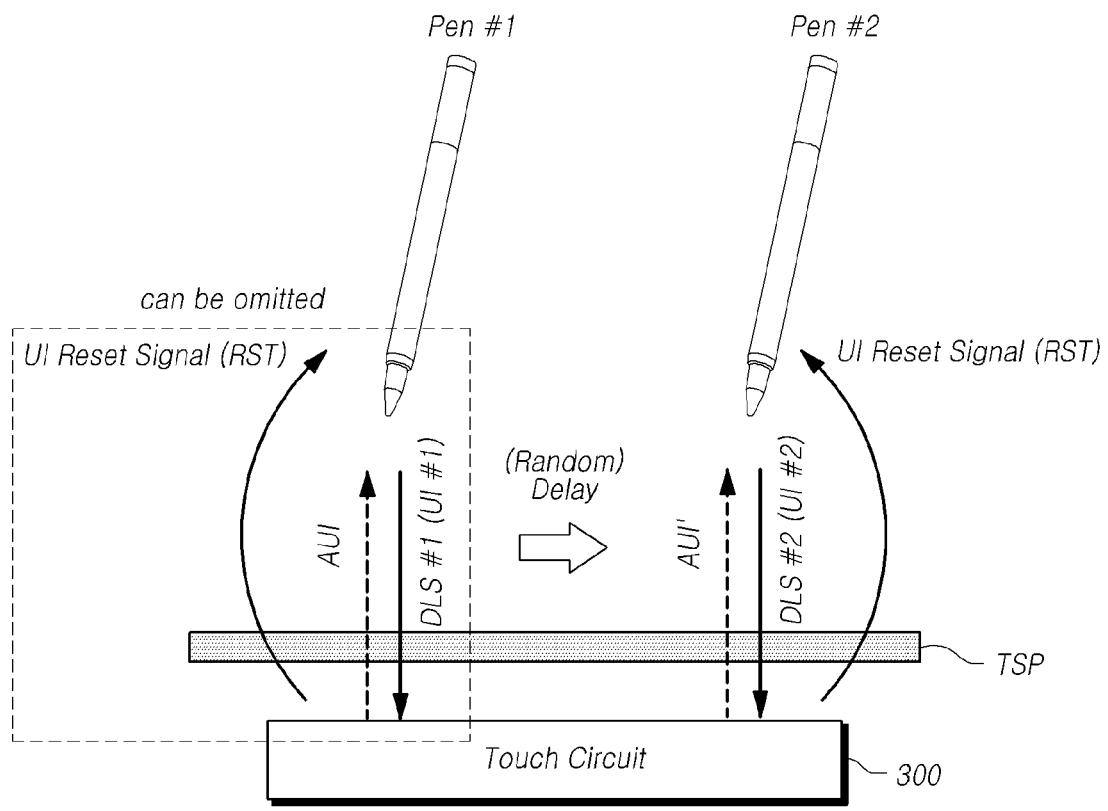
FIG. 23 illustrates a method of handling a situation in which codes corresponding to unique information of downlink signals output from a plurality of pens overlap each other in multi-pen sensing of the touch display device according to aspects of the present disclosure.

FIG. 23 illustrates a method of handling the situation in which codes corresponding to unique information (UI #1) of the downlink signals (DLS) output from two or more pens (Pen #1 to Pen #N) overlap each other in multi-pen sensing of the touch display device 10 according to aspects of the present disclosure.

Referring to FIG. 23, after supplying the uplink signal (ULS) containing available unique information (AUI) to the touch panel (TSP), the touch circuit 300 may receive the downlink signals (DLS) having the same unique information (UI #1) from the two pens (Pen #1 and Pen #2) through the touch panel (TSP). This is the situation in which pieces of unique information collide. At this time, the touch circuit 300 may recognize position of the two pens (Pen #1 and Pen #2).

The touch circuit 300 may output a unique information reset signal (RST) to the two pens (Pen #1 and Pen #2) through the uplink signal (ULS).

Accordingly, the two pens (Pen #1 and Pen #2) receive the unique information reset signal (RST) and release the preset unique information (UI #1).

At this time, the two pens (Pen #1 and Pen #2) may receive the unique information reset signal (RST) and release the preset unique information (UI #1) after a random time of each other. Accordingly, since a chance of receiving the uplink signal (ULS) such as the beacon signal containing new available unique information (AUI) at different time zones by the two pens (Pen #1 and Pen #2) increases, and thus different pieces of unique information (UI #1 and UI #2) may be reset at a high probability. For example, the random time for releasing the unique information may be configured using a random number generator and randomly configured within a predetermined time range.

Thereafter, the touch circuit 300 may transmit available unique information (AUI) only to the first pen (Pen #1) by outputting the uplink signal (ULS) such as the beacon signal containing new available unique information (AUI) only to an area corresponding to the position of the first pen (Pen #1) recognized on the touch panel (TSP).

Accordingly, the first pen (Pen #1) may output the downlink signal (DLS #1) having the first unique information (UI #1) by using the received available unique information (AUI).

Thereafter, the touch circuit 300 receives the downlink signal (DLS #1) having the first unique information (UI #1) from the first pen (Pen #1).

Subsequently, the touch circuit 300 may transmit available unique information (AUI) only to the second pen (Pen #2) by outputting the uplink signal (ULS) such as the beacon signal containing updated new available unique information (AUI') only to an area corresponding to the position of the second pen (Pen #2) recognized on the touch panel (TSP).

Accordingly, the second pen (Pen #2) may output the downlink signal (DLS #2) having the second unique information (UI #2) by using the received updated new available unique information (AUI').

Thereafter, the touch circuit 300 receives the downlink signal (DLS #2) having the second unique information (UI #2) from the second pen (Pen #2).

Accordingly, the touch circuit 300 may receive the downlink signals (DLS) having different pieces of unique information (UI) from the two or more pens (Pen #1 to Pen #N) at different time zones.

According to the above description, it is possible to perform multi-pen sensing in any situation without any collision between unique information by allowing the two or more pens (Pen #1 to Pen #N) to transmit downlink signals (DLS) having different pieces of unique information (UI).

The collision of the unique information may be handled through a method different from the above-described method.

For example, after supplying the uplink signal (ULS) containing available unique information (AUI) to the touch panel (TSP), the touch circuit 300 may receive the downlink signals (DLS) having the same unique information (UI #1) from the two or more pens (Pen #1 to Pen #N) through the touch panel (TSP). This is the situation in which pieces of unique information collide. At this time, the touch circuit 300 may recognize position of the two pens (Pen #1 and Pen #2).

The touch circuit 300 may transmit the uplink signal containing the unique information reset signal (RST) only to one or more of the two or more pens (Pen #1 to Pen #N) by outputting the uplink signal containing the unique information reset signal (RST) only to a particular area on the touch panel (TSP).

For example, the touch circuit 300 may transmit the unique information reset signal (RST) only to the second pen (Pen #2) among the two pens (Pen #1 and Pen #2) by outputting the uplink signal containing the unique information reset signal (RST) only to a particular area in which the touch electrode (TE) corresponding to the position of the second pen (Pen #2) on the touch panel (TSP) is disposed.

Accordingly, the second pen (Pen #2) receiving the unique information reset signal (RST) releases the previously set unique information (UI #1).

The touch circuit 300 may transmit new available unique information (AUI') only to the second pen (Pen #2) among the two pens (Pen #1 and Pen #2) by outputting the uplink signal, such as the beacon signal containing the new available unique information (AUI') only to a particular area in which the touch electrode (TE) corresponding to the position of the second pen (Pen #2) on the touch panel (TSP) is disposed.

The second pen (Pen #2) may output the downlink signal (DLS #2) having the second unique information (UI #2) by using the received new available unique information (AUI').

Thereafter, the touch circuit 300 may receive the downlink signal (DLS #2) having the second unique information (UI #2) from the second pen (Pen #2).

Figure 24:
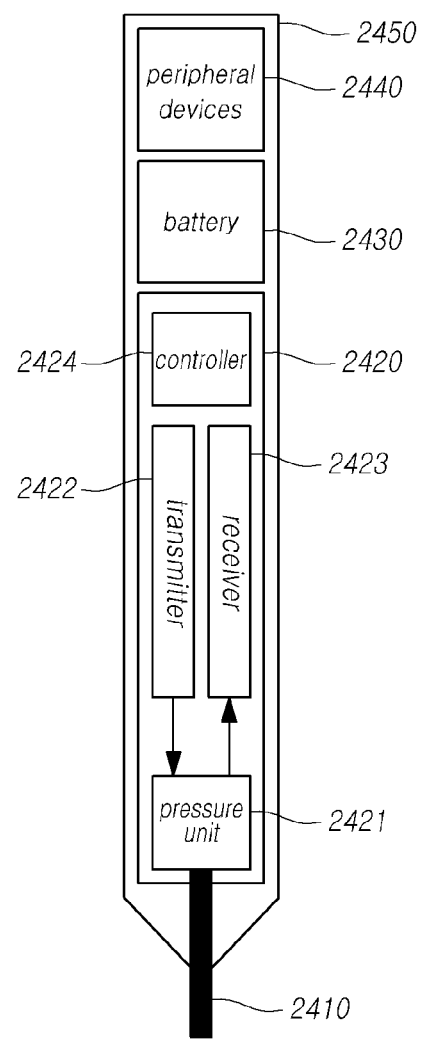
FIG. 24 illustrates a pen according to aspects of the present disclosure.

FIG. 24 illustrates a pen according to aspects of the present disclosure.

Referring to FIG. 24, the pen linking with the touch display device 10 may include a pen tip part 2410 including one or more pen tips in contact with or in proximity to (or, configured to be brought in contact with or in proximity to) the touch panel (TSP) of the touch display device 10 and a processor 2420 for receiving a panel driving signal (uplink signal) applied to the touch panel (TSP) through the pen tip part 2410 and outputting a downlink signal (a pen signal for sensing a position or tilt or a pen signal for transmitting data such as additional information) through the one or more pen tip parts 2410 in response to the panel driving signal (uplink signal).

The pen may further include a battery 2430, peripheral devices 2440 such as a button, a communication module (for example, Bluetooth), and a display device, and a case 2450 for accommodating the above-described various elements.

The processor 2420 may include a pressure unit 2421 for sensing pressure (pen pressure) applied to the pen tip part 2410, a receiver 2423 for receiving the uplink signal (ULS) applied to the touch panel (TSP) through the one or more pen tips, a transmitter 2422 for outputting the downlink signal (DLS) to the touch panel (TSP) through the one or more pen tips, and a controller 2424 for overall controlling the pen driving operation.

The pressure unit 2421 may include, for example, a pressure sensor (ex. MEMS) and an amplifier (Amp).

The receiver 2423 may sense a frequency of an electric field (that is, the uplink signal) received from the pen tip part 2410.

For example, the uplink signal may include a beacon signal or a ping signal.

The transmitter 2422 may output the downlink signal to the touch panel (TSP) in response to the uplink signal.

The controller 2424 may receive a signal from the receiver 2423 to determine a panel ID of the touch panel (TSP), generate a communication protocol suitable therefor, control timing of the transmitter 2422, receive information on a pressure signal from the pressure unit 2421 to make information thereon, and control other button signals.

The controller 2424 may be implemented as a Micro Control Unit (MCU).

The processor 2420 may include a switch for performing a switching operation with the pen tip part 2410, a frequency detector for sensing a frequency of an electric field (panel driving signal) received through the touch panel (TSP), and a pulse generator for generating pulses corresponding to various pen signals.

The controller 2424 may select a protocol according to a beacon signal and control pulse generation timing of the pulse generator according to a beacon signal or a ping signal.

Meanwhile, in the pen, the pen tip part 2410 is a part for receiving or transmitting an electric field, and may include the one or more pen tips.

When the pen tip part 2410 includes two or more pen tips, the two or more pen tips may be spaced apart from each other by a predetermined distance.

One of the two or more pen tips is a contact pen tip which is in contact with (or, is configured to be brought into contact with) the touch panel (TSP), and the other pen tip is a non-contact pen tip and may be spaced apart from the contact pen tip near the contact pen tip.

A value of the distance between the two or more pen tips may be output as a pen signal included in additional information.

The distance between the two or more pen tips is used for calculating a tilt (inclination) of the pen. Accordingly, by intentionally designing the distance between the two or more pen tips, the pen tilt can be calculated.

Meanwhile, the downlink signal (DLS) output from the pen for multi-pen sensing according to aspects of the present disclosure is a signal defined by a protocol between the touch panel (TSP) and the pen, and may be output in response to the uplink signal (ULS) and may have unique information (UI) of the pen.

Accordingly, through the pen, the touch display device 10 may perform multi-pen sensing.

The uplink signal (ULS) received by the pen according to aspects of the present disclosure may include a beacon signal containing available unique information (AUI).

The uplink signal (ULS) received by the pen according to aspects of the present disclosure may include a spread spectrum code signal.

The downlink signal output by the pen according to aspects of the present disclosure may include a signal having a unique code corresponding to unique information (UI) of the pen.

The downlink signal (DLS) output by the pen according to aspects of the present disclosure may include a signal having a unique frequency corresponding to unique information (UI) of the pen.

Figure 25:
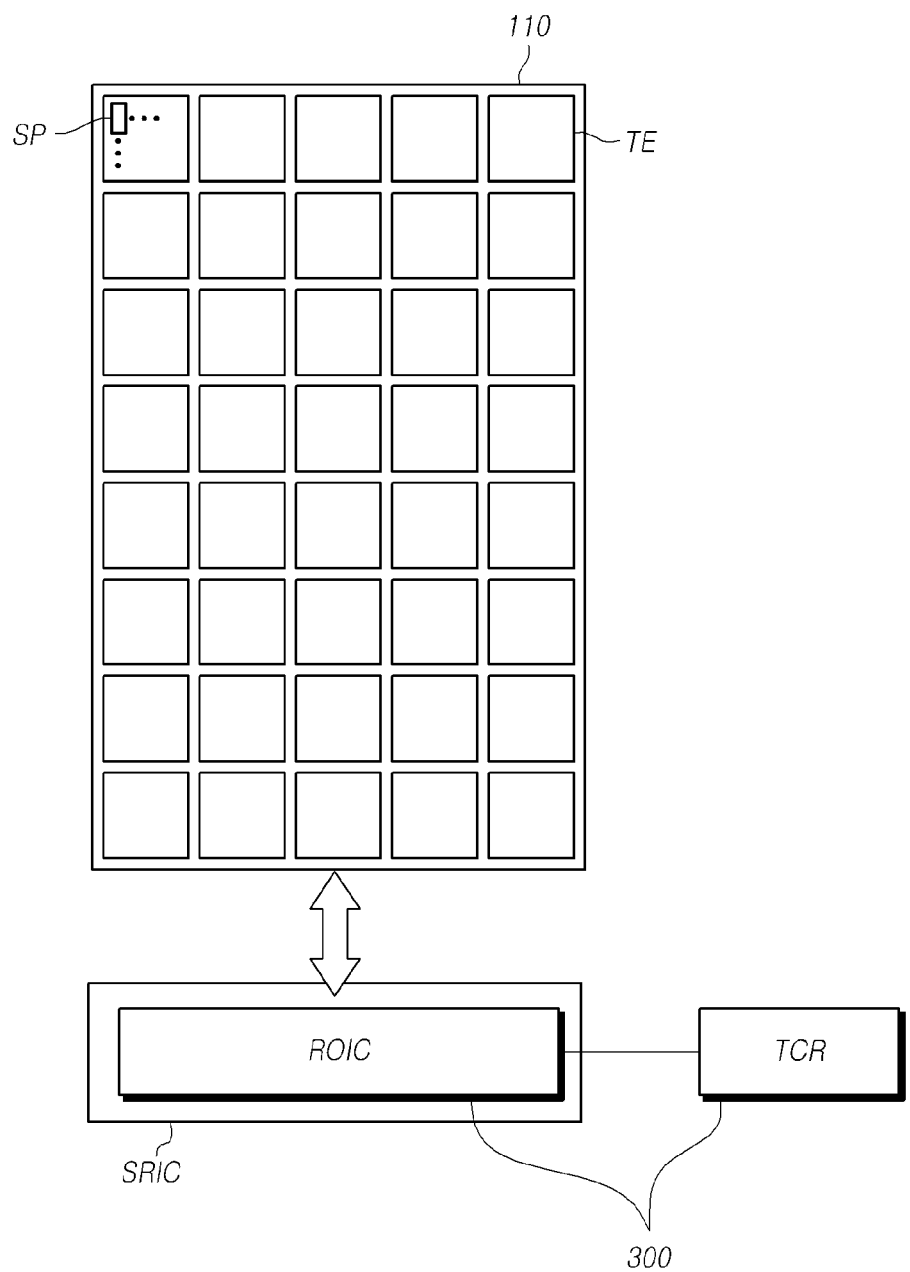
FIG. 25 a diagram illustrating a touch circuit according to aspects of the present disclosure.
Figure 26:
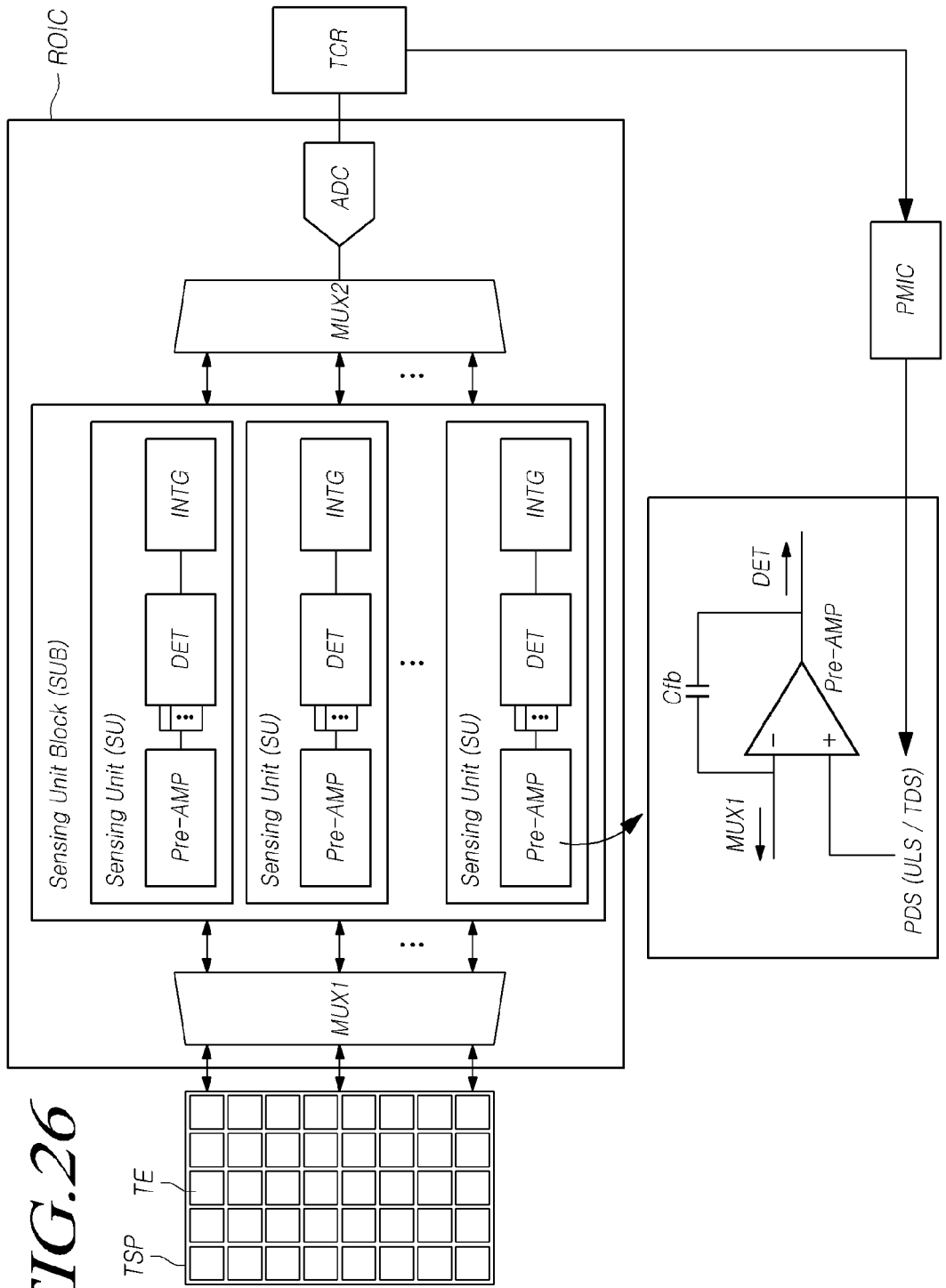
FIG. 26 briefly illustrates the internal circuit configuration of a first circuit of the touch circuit according to aspects of the present disclosure.

FIG. 25 is a diagram illustrating the touch circuit 300 according to aspects of the present disclosure, and FIG. 26 briefly illustrates the internal circuit configuration of the first circuit (ROIC) of the touch circuit 300 according to aspects of the present disclosure.

Referring to FIG. 25, the touch circuit 300 according to aspects may include one or more first circuits (ROIC) for outputting a panel driving signal to the touch panel (TSP), receiving a pen signal (downlink signal) output from the pen in response to a panel driving signal (uplink signal) through the touch panel (TSP), and outputting a digital value corresponding to the received pen signal, and a second circuit (TCR) for receiving the digital value for the pen signal and sensing touch input by the pen or recognizing pen information on the pen based on the digital value.

The one or more first circuits (ROIC) of the touch circuit 300 may be implemented as individual elements or implemented as a single element.

Meanwhile, the one or more first circuits (ROIC) of the touch circuit 300 and one or more source driver integrated circuits (SDIC) constituting the data driving circuit 120 may be integratively implemented as one or more integrated circuits (SRIC).

That is, each integrated circuit (SRIC) may include the first circuit (ROIC) and the source driver integrated circuit (SDIC).

Further, the one or more first circuits (ROIC) and the second circuit (TCR) of the touch circuit 300 may be integratively implemented as a single element.

In connection with finger touch sensing, the first circuit (ROIC) may output a panel driving signal corresponding to a touch driving signal (TDS) to the touch panel (TSP) and receive a touch sensing signal (SENS) through the touch panel (TSP).

The second circuit (TCR) may sense a position of touch input by a finger or a normal pen based on the touch sensing signal (SENS).

In connection with the pen position/tilt, the pen may output a pen signal corresponding to a downlink signal and the first circuit (ROIC) may receive the pen signal corresponding to the downlink signal through the touch panel (TSP).

The downlink signal may have unique information (UI) of the pen.

For example, the downlink signal may be expressed by a unique code (for example, a DSSS code) corresponding to unique information (UI) used for pen identification for multi-pen sensing.

In another example, the downlink signal may have a unique frequency corresponding to unique information (UI) used for pen identification for multi-pen sensing.

The second circuit (TCR) may identify the pen based on the pen signal, and may sense a position of touch input by the pen or sense a tilt of the pen.

In connection with recognition of additional pen information (data), the pen may output the pen signal corresponding to the downlink signal containing data including various pieces of additional information (for example, button information, pen pressure, and pen identification information), and the first circuit (ROIC) may receive the pen signal corresponding to the downlink signal through the touch panel (TSP).

The second circuit (TCR) may recognize additional information on the pen based on the pen signal.

FIG. 26 illustrates the internal circuit configuration of the first circuit (ROIC) of the touch circuit 300 according to the aspects.

Referring to FIG. 26, the first circuit (ROIC), which may be included within the integrated circuit (SRIC), may include a first multiplexer circuit (MUX1), a sensing unit block (SUB) including a plurality of sensing units (SU), a second multiplexer circuit (MUX2), and an analog-to-digital converter (ADC).

Each sensing unit (SU) may include a pre-amplifier (Pre-AMP), a detection circuit (DET), and an integrator (INTG).

The detection circuit (DET) may be one of the N detection circuits (DET #1 to DET #N) of FIG. 16 or 20.

Each sensing unit (SU) may further include a sample and hold circuit in some cases.

One sample and hold circuit may be included in every sensing unit (SU).

Alternatively, one sample and hold circuit may exist in every two sensing units (SU), or one sample and hold circuit may exist for all the plurality of sensing units (SU) in some cases.

The panel driving signal (uplink signal (ULS) or the touch driving signal (TDS)) for various purposes may be transferred to the corresponding touch electrode (TE) through the corresponding signal line (SL) on the touch panel (TSP) via the first multiplexer circuit (MUX1) through an input terminal (for example, a non-inverting input terminal) of the pre-amplifier (Pre-AMP).

The first multiplexer circuit (MUX1) selects one of the signals received from the touch panel (TSP).

The signals received from the touch panel (TSP) may be touch sensing signals (SENS) or downlink signals (DLS).

The signal selected by the first multiplexer circuit (MUX1) may be transferred to the corresponding sensing unit (SU) within the sensing unit block (SUB) and input to the detection circuit (DET) through the pre-amplifier (Pre-AMP).

A voltage output from the detection circuit (DET) is input to the integrator (INTG).

The detection circuit (DET) is one of the N detection circuits (DET #1 to DET #N) of FIG. 16 or 20.

The integrator (INTG) outputs an integral value of the voltage output from the detection circuit (DET). The integrator (INTG) may include elements such as a comparator and a capacitor.

The signal output from the integrator (INTG) may be input to the second multiplexer circuit (MUX2) via the sample and hold circuit.

The second multiplexer circuit (MUX2) selects one of the plurality of sensing units (SU) and inputs the output voltage of the selected sensing unit to the analog-to-digital converter (ADC).

The analog-to-digital converter (ADC) converts the input voltage into a digital value and outputs a sensing value corresponding to the converted digital value.

The output sensing value may be used by the second circuit (TCR) for detecting the presence of a touch by a finger and/or a touch position, used for detecting the presence of a touch by a pen and/or a touch position, or used for recognizing pen information on the pen.

As described above, the panel driving signals (the touch driving signals (TDS) and uplink signals (ULS)) may be supplied to the touch panel (TSP) through the pre-amplifier (Pre-AMP) within the first circuit (ROIC).

The panel driving signals (the touch driving signals (TDS) and uplink signals (ULS)) may be generated by the second circuit (TCR), amplified by the power management integrated circuit (PMIC), and input to the first circuit (ROIC).

The panel driving signals may be supplied to the touch panel (TSP) through a method different from the above-described method.

Figure 27:
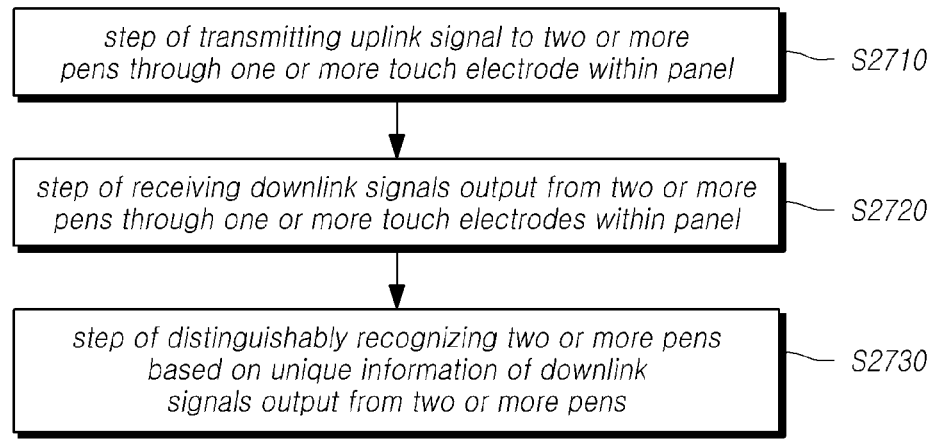
FIG. 27 is a flowchart illustrating a multi-pen sensing method according to aspects of the present disclosure.

FIG. 27 is a flowchart illustrating a multi-pen sensing method according to aspects of the present disclosure.

Referring to FIG. 27, a multi-pen sensing method according to aspects of the present disclosure may include a step S2710 of transmitting an uplink signal (ULS) to two or more pens (Pen #1 to Pen #N) through one or more touch electrodes (TE) within a touch panel (TSP), a step S2720 of receiving downlink signals (DLS) output from the two or more pens (Pen #1 to Pen #N) through the one or more touch electrodes (TE) within the touch panel (TSP), and a step S2730 of distinguishably sensing the two or more pens (Pen #1 to Pen #N) based on unique information (UI) of the downlink signals (DLS) output from the two or more pens (Pen #1 to Pen #N).

Through the above-described multi-pen sensing method, the two or more pens (Pen #1 to Pen #N) may be accurately distinguishably recognized. That is, the touch circuit 300 may accurately distinguish pen signals by recognizing a pen from which the received pen signal was output, and use the pen signal for pen sensing. Accordingly, it is possible to perform accurate pen input processing for the two or more pens (Pen #1 to Pen #N).

The uplink signal (ULS) may include available unique information (AUI) referenced by the two or more pens (Pen #1 to Pen #N) to generate downlink signals (DLS) having different pieces of unique information (UI).

According to the aspects of the present disclosure described above, a touch display device, a touch circuit, a pen, a touch system, and a multi-pen sensing method for simultaneously sensing multiple pens can be provided.

According to the aspects of the present disclosure described above, a touch display device, a touch circuit, a pen, a touch system, and a multi-pen sensing method for accurately distinguishably recognizing multiple pens in any situation can be provided.

According to the aspects of the present disclosure described above, a touch display device, a touch circuit, a pen, a touch system, and a multi-pen sensing method for reducing an influence of signal noise in sensing the pen through signal transmission/reception between the pen and the touch panel can be provided.

According to the aspects of the present disclosure described above, a touch display device, a touch circuit, a pen, a touch system, and a multi-pen sensing method for increasing usage efficiency of power and a bandwidth in sensing the pen through signal transmission/reception between the pen and the touch panel can be provided.

Meanwhile, the touch system according to aspects of the present disclosure may include all of a beacon signal transmission period, a pen position sensing period, a pen information sensing period, and a finger sensing period or only some thereof during one frame period.

In one frame period, the number and order of periods such as the beacon signal transmission period, the pen position sensing period, the pen information sensing period, and the finger sensing period may be variously changed during one frame period.

Within one frame period, an LHB driving method indicating the order and the type in which the respective LHBs are allocated, a transmission method of signals related to panel and pen driving in the respective LHBs, and a signal format may be predefined by a protocol, and the protocol may be predefined between the touch display device 10 and the pen or may be transferred to the pen from the touch display device 10 through a beacon signal.

The protocol may be adaptively changed according to various condition changes such as a driving environment of the touch system, the presence of the pen, and the number of pens, or a driving state or condition of the panel or the pen.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspects. The scope of the present disclosure shall be construed on the basis of the accompanying claims.

What is claimed is:

1. A touch circuit comprising:
a first circuit including a plurality of detection circuits that receive output signals from a touch panel that include a touch sensing signal and a downlink signal, a multiplexer that selects a signal to configure to receive the downlink signal from each of two or more pens through one or more touch electrodes within the touch panel, and an analog digital converter configured to convert the output voltage selectively output from the multiplexer to generate a sensing value; and
a second circuit receiving the sensing value from the analog digital converter to configure to sense the two or more pens such that touches of the two or more pens are distinguished based on unique information of the received downlink signal, transmitting an uplink signal to the plurality of detection circuits, and the uplink signal and the downlink signal are transmitted to the touch panel through the first circuit and the analog digital converter directly connected with the second circuit,
wherein the touch circuit is configured to supply the uplink signal including available unique information to the panel and receive the downlink signal through the panel, wherein the downlink signal has the unique information determined by a pen in contact with or in proximity to the panel based on the available unique information,
wherein each of the two or more pens configures the unique information that is information corresponding to, and different from, the available unique information provided from the touch circuit, and is extracted from a memory of each pen for a pen identification purpose,
wherein the uplink signal including the available unique information is supplied from the touch circuit to the panel in a touch driving period between two display driving periods in one frame time in which display driving and touch driving may be simultaneously performed,
wherein, when the touch circuit receives the downlink signal having identical unique information from the two or more pens after supplying the uplink signal including the available unique information to the panel, the touch circuit outputs a unique information reset signal to one or more of the two or more pens through the uplink signal and thereafter receives a downlink signal having new unique information from one or more of the two or more pens, and
wherein after the unique information reset signal is outputted to the one or more of the two or more pens through the uplink signal, the touch circuit transmits new available unique information through an uplink signal containing the new available unique information to only an area in the panel corresponding to a position of a first pen of the two or more pens, and thereafter, transmits new available unique information through an uplink signal containing updated new available unique information to only an area in the panel corresponding to a position of a second pen of the two or more pens.

2. The touch circuit of claim 1, wherein the unique information of the downlink signal output from each of the two or more pens corresponds to a pen ID of each of the two or more pens.

3. The touch circuit of claim 1, wherein the unique information of the downlink signal output from each of the two or more pens is a unique code expressed by the downlink signal output from each of the two or more pens.

4. The touch circuit of claim 3, wherein the unique code expressed by the downlink signal output from each of the two or more pens is a direct sequence spread spectrum code orthogonal to each other.

5. The touch circuit of claim 1, wherein the unique information of the downlink signal output from each of the two or more pens is a unique frequency of the downlink signal output from each of the two or more pens.

6. The touch circuit of claim 1, wherein the touch circuit is configured to transfer the available unique information to the pen in contact with or in proximity to the panel by supplying a beacon signal having the available unique information to the panel, and the beacon signal is one of uplink signals defined by a protocol between the panel (TSP) and the pen and is supplied to the panel for one or more blank periods corresponding to a beacon signal transmission period among a plurality of blank periods within one frame time.

7. The touch circuit of claim 1, wherein
the plurality of detection circuits correspondingly connected to a plurality of touch electrodes within the panel.

8. The touch circuit of claim 7, wherein each of the plurality of detection circuits includes:
a decoder circuit configured to identify whether unique information of the downlink signal received from a corresponding touch electrode is included in an already known unique information list; and
a detector configured to output a voltage corresponding to unique information of the downlink signal received from a corresponding touch electrode (TE).

9. The touch circuit of claim 1, wherein the first circuit is configured to supply the uplink signal including the available unique information to the panel and receive the downlink signal through the panel.

10. The touch circuit of claim 9, wherein the first circuit or the second circuit is configured to update pre-stored available unique information when receiving the downlink signal having the unique information output from the pen in contact with or in proximity to the panel.

11. The touch circuit of claim 9, wherein the first circuit is configured to transfer the available unique information to the pen in contact with or in proximity to the panel by supplying a beacon signal having the available unique information to the panel, and the beacon signal is one of uplink signals defined by a protocol between the panel and the pen and is supplied to the panel for one or more blank periods corresponding to a beacon signal transmission period among a plurality of blank periods within one frame time.

12. A touch display device comprising:
a touch panel on which a plurality of touch electrodes is arranged; and
a touch circuit configured to receive a downlink signal output from each of two or more pens through one or more touch electrodes of the panel and sense the two or more pens such that the two or more pens are distinguished from each other based on unique information of the received downlink signal, and inclduing a first circuit and a second circuit, the first circuit including a plurality of detection circuits, a multiplexer and an analog digital converter that directly connected with the second circuit,
wherein the plurality of detection circuits receives output signals from a touch panel that include a touch sensing signal and a downlink signal and the multiplexer selects a signal to configure to receive the downlink signal from each of two or more pens through one or more touch electrodes within the touch panel, and the analog digital converter is configured to convert the output voltage selectively output from the multiplexer to generate a sensing value; and
wherein the second circuit receives the sensing value from analog digital converter to configure to sense the two or more pens such that touches of the two or more pens are distinguished based on unique information of the received downlink signal, transmits an uplink signal to the plurality of detection circuits, and the uplink signal and the downlink signal are transmitted to the touch panel through the first circuit,
wherein the touch circuit is configured to supply the uplink signal including available unique information to the panel and receive the downlink signal through the panel,
wherein the downlink signal has the unique information determined by a pen in contact with or in proximity to the panel based on the available unique,
wherein each of the two or more pens configures the unique information that is information corresponding to, and different from, the available unique information provided from the touch circuit, and is from a memory of each pen for a pen identification purpose,
wherein the uplink signal including the available unique information is supplied from the touch circuit to the panel in at least a part of a touch driving period between two display driving periods in one frame time in which display driving and touch driving may be simultaneously performed,
wherein when the touch circuit receives the downlink signal having identical unique information from the two or more pens after supplying the uplink signal including the available unique information to the panel, the touch circuit outputs a unique information reset signal to one or more of the two or more pens through the uplink signal and thereafter receives a downlink signal having new unique information from one or more of the two or more pens, and
wherein after the unique information reset signal has been outputted to the one or more of the two or more pens through the uplink signal, the touch circuit transmits new available unique information through an uplink signal containing the new available unique information to only an area in the panel corresponding to a position of a first pen of the two or more pens, and thereafter, transmits new available unique information through an uplink signal containing updated new available unique information to only an area in the panel corresponding to a position of a second pen of the two or more pens.

13. A pen configured to link with a touch display device, comprising:

one or more pen tips configured to be brought in contact with or in proximity to a touch panel of the touch display device;

a receiver configured to receive an uplink signal applied to the touch panel through the one or more pen tips;

a transmitter configured to output a downlink signal to the touch panel through the one or more pen tips;

a case accommodating the one or more pen tips, the receiver, and the transmitter; and a touch circuit configured to receive the downlink signal output from each of two or more pens through one or more touch electrodes of the panel and sense the two or more pens such that the two or more pens are distinguished from each other based on unique information of the received downlink signal, and including a first circuit and a second circuit, the first circuit including a plurality of detection circuits, a multiplexer and an analog digital converter that directly connected with the second circuit, wherein the plurality of detection circuits receives output signals from a touch panel that include a touch sensing signal and a downlink signal and the multiplexer selects a signal to configure to receive the downlink signal from each of two or more pens through one or more touch electrodes within the touch panel, and the analog digital converter is configured to convert the output voltage selectively output from the multiplexer to generate a sensing value, wherein the second circuit receives the sensing value from analog digital converter of the first circuit to configure to sense the two or more pens such that touches of the two or more pens are distinguished based on unique information of the received downlink signal, transmits an uplink signal to the plurality of detection circuits, and the uplink signal and the downlink signal are transmitted to the touch panel through the first circuit, wherein the downlink signal is a signal defined by a protocol between the panel and the pen, is output in response to the uplink signal, and has unique information of the pen, wherein the unique information of the pen is configured such that the pens has received an uplink signal containing available unique information from a touch circuit through a panel, and then configure the unique information according to the available unique information, wherein each of the two or more pen tips configures the unique information that is information corresponding to, and different from, the available unique information provided from the touch circuit, and is extracted from a memory of each pen for a pen identification purpose, wherein the uplink signal including the available unique information is supplied from the touch circuit to the panel in a touch driving period between two display driving periods in one frame time in which display driving and touch driving may be simultaneously performed, wherein when the downlink signal having identical unique information from the two or more pens is transmitted to the panel after receiving the uplink signal including the available unique information from the panel, one or more of the two or more pens receives a unique information reset signal from through the uplink signal and thereafter transmits a downlink signal having new unique information to the panel, and wherein after the two or more pens has received the unique information reset signal from through the uplink signal, a first pen of the two or more pens receives new available unique information through an uplink signal containing the new available unique information from only an area in the panel corresponding to a position of the first pen of the two or more pens, and thereafter, a second pen of the two or more pens receives new available unique information through an uplink signal containing updated new available unique information from only an area in the panel corresponding to a position of the second pen of the two or more pens.

14. The pen of claim 13, wherein the uplink signal includes at least one of a beacon signal containing available unique information and a spread spectrum code signal.

15. The pen of claim 13, wherein the downlink signal includes a signal having a unique code corresponding to unique information of the pen, or a signal having a unique frequency corresponding to unique information of the pen.

16. A multi-pen sensing method, the multi-pen sensing method comprising:

transmitting an uplink signal to two or more pens through one or more touch electrodes within a touch panel;

receiving a downlink signal output from each of the two or more pens through the one or more touch electrodes within the touch panel; and sensing the two or more pens such that the pens are distinguished based on unique information of the downlink signal output from each of the two or more pens, wherein the unique information of the downlink signal output from each of the two or more pens is configured by each of the two or more pens such that each of the two or more pens has received an uplink signal containing available unique information from a touch circuit including a first circuit and a second circuit, the first circuit including a plurality of detection circuits, a multiplexer and an analog digital converter that directly connected with the second circuit through the touch panel, and then configure the unique information according to the available unique information, wherein the plurality of detection circuits receives output signals from a touch panel that include a touch sensing signal and a downlink signal and the multiplexer selects a signal to configure to receive the downlink signal from each of two or more pens through one or more touch electrodes within the touch panel, and the analog digital converter is configured to convert the output voltage selectively output from the multiplexer to generate a sensing value, wherein the second circuit receives the sensing value from analog digital converter to configure to sense the two or more pens such that touches of the two or more pens are distinguished based on unique information of the received downlink signal, transmits an uplink signal to the plurality of detection circuits, and the uplink signal and the downlink signal are transmitted to the touch panel through the first circuit, wherein each of the two or more pens configures the unique information that is information corresponding to, and different from, the available unique information provided from the touch circuit, and is extracted from a memory of the each pen for a pen identification purpose, wherein the uplink signal including the available unique information is supplied from the touch circuit to the panel in a touch driving period between two display driving periods in one frame time in which display driving and touch driving may be simultaneously performed, wherein when the touch circuit receives the downlink signal having identical unique information from the two or more pens after supplying the uplink signal including the available unique information to the panel, the touch circuit outputs a unique information reset signal to one or more of the two or more pens through the uplink signal and thereafter receives a downlink signal having new unique information from one or more of the two or more pens, and wherein after the unique information reset signal has been outputted to the one or more of the two or more pens through an uplink signal, the touch circuit transmits new available unique information through the uplink signal containing the new available unique information to only an area in the panel corresponding to a position of a first pen of the two or more pens, and thereafter, transmits new available unique information through an uplink signal containing updated new available unique information to only an area in the panel corresponding to a position of a second pen of the two or more pens.

17. The multi-pen sensing method of claim 16, wherein the uplink signal contains available unique information referenced to generate downlink signals having different pieces of unique information of the two or more pens.

* * * * *